US010322942B2

(12) United States Patent
Attidekou et al.

(10) Patent No.: US 10,322,942 B2
(45) Date of Patent: Jun. 18, 2019

(54) SILICON PHOSPHATE AND MEMBRANE COMPRISING THE SAME

(75) Inventors: Pierrot Sassou Attidekou, Fife (GB); John Thomas Sirr Irvine, Fife (GB)

(73) Assignee: UNIVERSITY COURT OF THE UNIVERSITY OF ST ANDREWS, St Andrews (GB)

( * ) Notice: Subject to any disclaimer, the term of this patent is extended or adjusted under 35 U.S.C. 154(b) by 324 days.

(21) Appl. No.: 13/514,577

(22) PCT Filed: Nov. 29, 2010

(86) PCT No.: PCT/GB2010/002194
§ 371 (c)(1),
(2), (4) Date: Jul. 16, 2012

(87) PCT Pub. No.: WO2011/070312
PCT Pub. Date: Jun. 16, 2011

(65) Prior Publication Data
US 2012/0276468 A1    Nov. 1, 2012

(30) Foreign Application Priority Data

Dec. 8, 2009   (GB) .................... 0921451.1

(51) Int. Cl.
*B01D 65/00*   (2006.01)
*C01G 23/047*   (2006.01)
(Continued)

(52) U.S. Cl.
CPC ....... *C01G 23/047* (2013.01); *B01D 67/0048* (2013.01); *B01D 71/027* (2013.01);
(Continued)

(58) Field of Classification Search
CPC ....... C01B 33/152; C25B 13/08; C25B 13/04; B01D 67/0048; B01D 71/027; C08J 5/2231; H01M 8/1016; H01M 8/0289
(Continued)

(56) References Cited

U.S. PATENT DOCUMENTS 1,993,512 A    3/1935  Ipatieff
1,993,513 A    3/1935  Ipatieff
(Continued)

FOREIGN PATENT DOCUMENTS

EP    0570070 A1    11/1993
EP    0702376 A1    3/1996
(Continued)

OTHER PUBLICATIONS

Diaz et al "Synthesis and characterization on of cyclotriphosphazenes containing silicon as single solid-state precursors for the formation of silicon/phosphorus nanostructured materials". Inorg. Chem., vol. 47. pp. 11561-11569 (2008).*

(Continued)

*Primary Examiner* — Stephen J Yanchuk
(74) *Attorney, Agent, or Firm* — McDermott Will & Emery LLP; Judy M. Mohr; Wen Li

(57) ABSTRACT

The invention provides a composition having the formula (I): $xXO_2 \cdot yY_2O_5$, (wherein: $0.5 < x < 0.7$; $0.3 < y < 0.5$; X comprises one or more of silicon, titanium, germanium and zirconium; and Y comprises one or more of phosphorus, vanadium arsenic and antimony), or a hydrate thereof, in which the composition comprises more than 50 wt % or more of crystalline material.

21 Claims, 18 Drawing Sheets

(51) Int. Cl.
  B01D 67/00 (2006.01)
  B01D 71/02 (2006.01)
  C08J 5/22 (2006.01)
  H01M 8/1016 (2016.01)
  H01M 8/0289 (2016.01)

(52) U.S. Cl.
  CPC .......... C08J 5/2231 (2013.01); H01M 8/0289 (2013.01); H01M 8/1016 (2013.01); B01D 2325/42 (2013.01); C01P 2002/50 (2013.01); C01P 2002/72 (2013.01); C01P 2002/88 (2013.01); C01P 2004/03 (2013.01); C01P 2004/04 (2013.01); C01P 2004/61 (2013.01); C01P 2006/10 (2013.01); C01P 2006/40 (2013.01); C08J 2343/00 (2013.01)

(58) Field of Classification Search
  USPC .................................... 429/465, 479–497
  See application file for complete search history.

(56) References Cited

U.S. PATENT DOCUMENTS

| | | | |
|---|---|---|---|
| 2,120,702 | A | 6/1938 | Ipatieff et al. |
| 2,157,208 | A | 5/1939 | Ipatieff et al. |
| 2,275,182 | A | 3/1942 | Ipatieff et al. |
| 2,650,201 | A | 8/1953 | Mavity |
| 2,324,073 | A | 2/1958 | Rylander et al. |
| 3,050,472 | A | 8/1962 | Morrell |
| 3,112,350 | A | 11/1963 | Bielawski et al. |
| 3,661,801 | A | 5/1972 | Gutmann et al. |
| 3,673,111 | A | 6/1972 | Hovarth et al. |
| 4,521,638 | A | 6/1985 | Kida et al. |
| 4,946,815 | A | 8/1990 | Chao et al. |
| 5,059,737 | A | 10/1991 | Chao et al. |
| 5,824,825 | A | 10/1998 | Lansink-Rotgerink et al. |
| 5,849,428 | A | 12/1998 | Hamlen |
| 6,111,159 | A | 8/2000 | Huff et al. |
| 2002/0150811 | A1 | 10/2002 | Chikano et al. |
| 2005/0221143 | A1 | 10/2005 | Kwon et al. |
| 2007/0207360 | A1 | 9/2007 | Tamura et al. |
| 2008/0063921 | A1 | 3/2008 | Hong et al. |
| 2009/0005623 | A1 | 1/2009 | Xu et al. |
| 2009/0022972 | A1* | 1/2009 | Fujita ................. C01B 25/45 428/220 |
| 2009/0099400 | A1 | 4/2009 | Hamamatsu et al. |
| 2009/0297912 | A1 | 12/2009 | Hibino et al. |
| 2010/0266927 | A1* | 10/2010 | Suzuki ............... H01M 4/8605 429/479 |
| 2010/0323275 | A1* | 12/2010 | Machida ............ C08G 65/4056 429/493 |

FOREIGN PATENT DOCUMENTS

| | | | | |
|---|---|---|---|---|
| EP | 1648047 A1 | 4/2006 | | |
| EP | 1894627 A1 | 3/2008 | | |
| EP | 1977996 A1 | 10/2008 | | |
| GB | 1415141 A | 11/1975 | | |
| JP | 59-195536 A | 11/1984 | | |
| JP | 63-067562 A | 3/1988 | | |
| JP | 7-65624 A | 3/1995 | | |
| JP | 10-097811 | * 4/1998 | ............... H01B 1/06 |
| JP | 2000-272932 | * 3/1999 | ............... C03C 3/097 |
| JP | 2000272932 A | 10/2000 | | |
| JP | 2003297392 A | 10/2003 | | |
| JP | 2004006142 A | 1/2004 | | |
| JP | WO 2008096743 A1 | * 8/2008 | ......... C08G 65/4056 |
| JP | WO 2009068949 A2 | * 6/2009 | ......... H01M 4/8605 |
| KR | 100792713 B1 | 1/2008 | | |
| WO | WO 2007/082350 A1 | 7/2007 | | |
| WO | WO 2008/075297 A2 | 6/2008 | | |
| WO | WO 2008/096743 A1 | 8/2008 | | |
| WO | WO 2008096743 A1 | * 8/2008 | ............... H01M 8/10 |
| WO | WO 2009068949 A2 | * 6/2009 | ............... H01M 8/10 |

OTHER PUBLICATIONS

Matsuda et al., Medium temperature range characterization as a proton conductor for phosphosilicate dry gels containing large amounts of phosphorus, Electrochimica Acta, vol. 47, No. 6, pp. 939-944 (2001).*
English translation of JP 2000-272932.*
English translation of JP10-097811.*
Diaz et al., "Synthesis and characteriztion of cyclotriphosphazenes containing silicon as single solid-state precursors for the formation of silicon/phosphorus nanostructured materials". Inorg Chem., vol. 47, pp. 11561-11569 (2008).*
Matsui et al ("An Intermediate Temperature Proton-Conducting Electrolyte Based on a CsH2PO4/SiP2O7 Composite". Electrochemical and Solid State Letters. 8 (5) A256-A258 (2005).*
Diaz et al., "Synthesis and characterization of cyclotriphosphazenes containing silicon as single solid-state precursors for the formation of silicon/phosphorus nanostructured materials", Inorg. Chem., vol. 47, pp. 11561-11569 (2008).
International Search Report from related PCT Patent Application No. PCT/GB2010/002194 dated May 4, 2011, application now published as WO 2011/070312 dated Jun. 16, 2011.
Krawietz et al., "Solid phoshoric acid catalyst: a multinuclear NMR and theoretical study", J. Am. Chem. Soc., vol. 120, No. 33, pp. 8502-8511 (1998).
Mayer "Die kristallstruker von Si50[P04]6", Monatshefte Für Chemie, vol. 105, pp. 46-54 (1974) *English Abstract.*
Poojary et al., "Crystal Structure of Silicon Pyrophosphate (Form I) from Powder Diffraction Data", J. Solid State Chemistry, vol. 112, pp. 106-112 (1994).
Poojary et al., "Structural characterization of silicon orthophosphate", Inorganica Chimica Acta, vol. 208, Issue 1, pp. 23-29 (1993).
United Kingdom Search Report from related Great Britain Patent Application No. GB0921451.1, date of search Apr. 30, 1010, dated May 4, 2010.

* cited by examiner

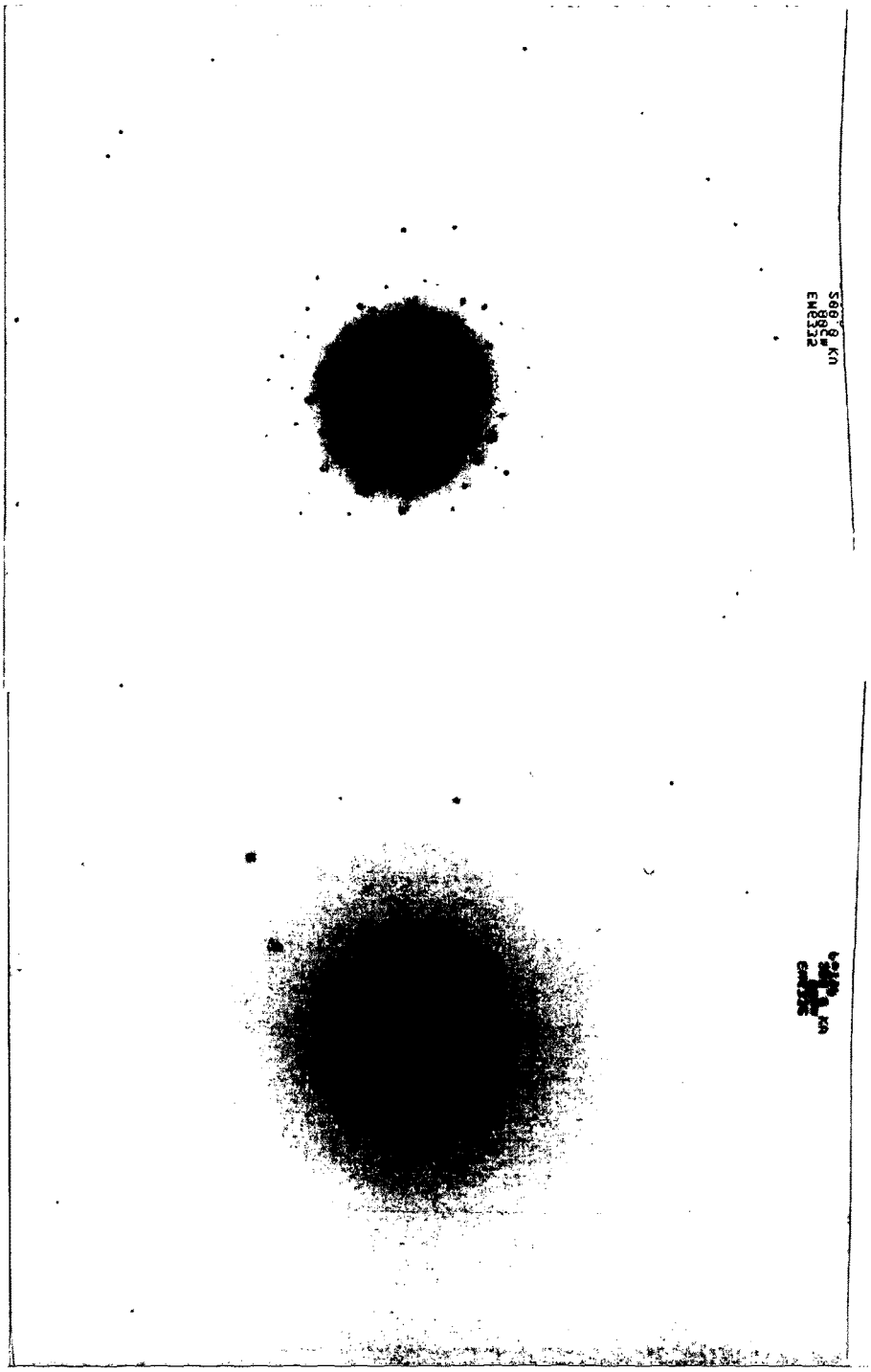

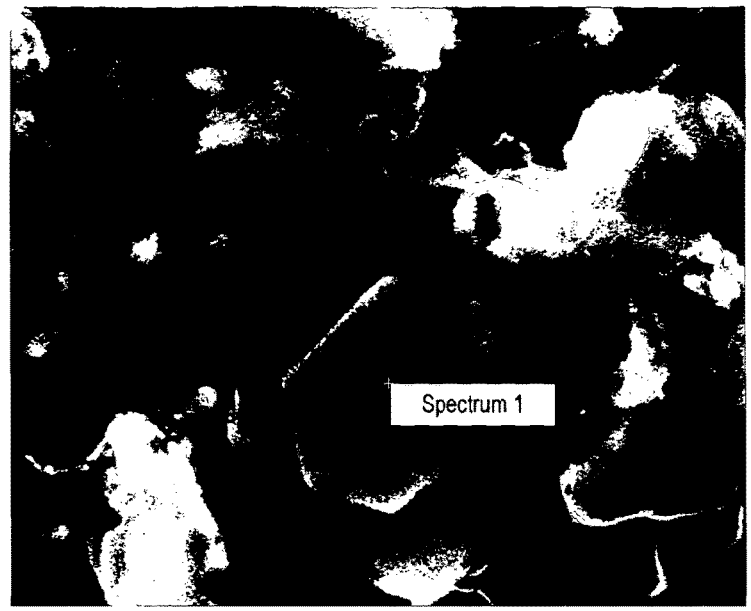
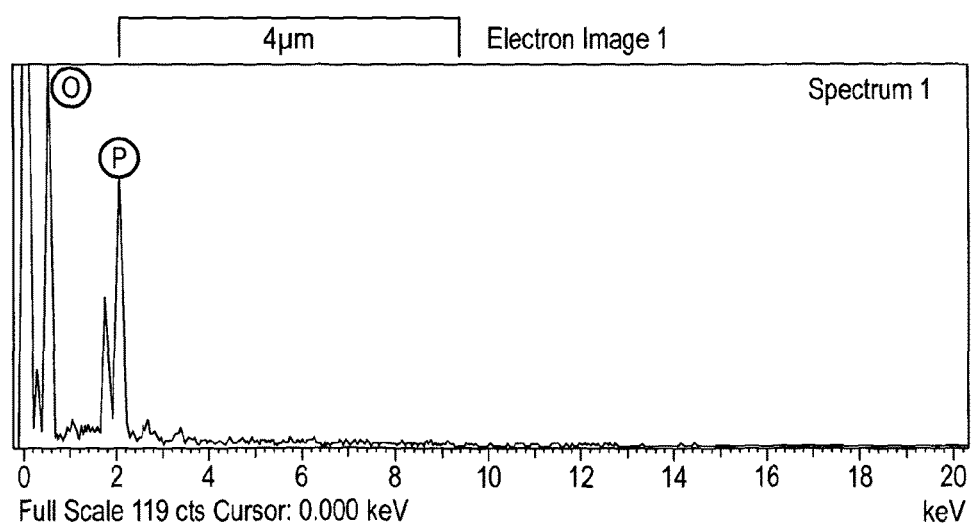
FIG. 4b

US 10,322,942 B2

SILICON PHOSPHATE AND MEMBRANE COMPRISING THE SAME

This application is a U.S. National Stage of International Patent Application No. PCT/GB2010/002194, filed Nov. 29, 2010, which claims the benefit of priority to GB Application No. 0921451.1 filed Dec. 8, 2009, each of which is hereby incorporated by reference in its entirety.

FIELD OF THE INVENTION

The present invention relates to the use of phosphorus silicon oxide as an ionic conductor in a variety of electrochemical devices, in particular its use as a membrane in proton exchange membrane fuel cells, and to electrochemical devices comprising phosphorus silicon oxide as an ionic conductor.

BACKGROUND OF THE INVENTION

With oil reserves being depleted, the possibility of using fuel cells as an alternative means to provide electrical energy is attracting ever-increasing interest. Of the many types of fuel cell devised to date, proton exchange membrane fuel cells (PEMFCs) are of greater and greater potential with the world moving towards a hydrogen-based technology. PEMFCs can cleanly and efficiently convert the chemical energy of hydrogen and oxygen into water and electrical & thermal energy.

In PEMFCs, hydrogen and oxygen react at separate electrodes—anode and cathode respectively—with the hydrogen being disassociated at the anode with the use of a catalyst into protons and electrons. The protons so generated diffuse through the electrically insulating polymer electrolyte membrane and the electrons travel by an external load circuit to the cathode, the passage of the electrons along this external load circuit providing the current output of the fuel cell. At the cathode, molecular oxygen combines with the protons that have passed through the polymer electrolyte membrane and the electrons that have passed through the external load circuit to form water.

A key feature of PEMFCs, therefore, is the nature of the polymer electrolyte membrane (PEM) interposed between the anode and the cathode. Often this membrane is referred to as a proton exchange membrane (also PEM) given the requirement of the membrane to facilitate the migration of protons (but not electrons) within the fuel cell. In addition to these functions, the membrane must not permit the passage of gas in either direction and be able to withstand the reductive and oxidative chemistries taking place at the cathode and anode respectively.

The polymer electrolyte Nafion®, which is a sulfonated tetrafluroroethylene-based fluoropolymer-copolymer discovered in the 1960's, is probably the PEM most commonly used. The utility of Nafion® in PEMFCs is believed to arise from its ability to transport protons as a consequence of its pendant sulfonic acid side groups, but that it is electrically insulating to anions or electrons. Over time, Nafion® loses fluorine from its structure. Nafion® relies on the presence of water to function as a conductor of protons. This means that PEMFCs employing Nafion® as PEM are restricted to operating temperatures of less than 100° C., implying low-temperature applications. At temperature approaching and in excess of 100° C., so-called fuel cell dehydration takes place the PEM becomes too dry to conduct protons to the cathode effectively resulting in a drop in power output. This illustrates a particular difficulty inherent to PEMFCs: the presence and maintenance of appropriate amounts of water. Effective management of the water generated within PEMFCs is a key issue in relation to the success of PEMFCs. Whilst problems can exist in Nafion®-based PEMFCs, with other PEMs too much water can also be detrimental.

It would be advantageous to expand the range of potential application of PEMFCs, in particular to further their use in electric vehicles (EVs). Since automotive air cooling systems can operate effectively at temperatures of around 130 to 140° C., increasing the temperature at which PEMFCs can function would be particularly advantageous to the automotive industry as it seeks to accelerate research into the incorporation of PEMFCs into EVs on account of the present environmental and economic climate. Being able to operate PEMFCs at this temperature range would obviate the need for expensive cooling systems which are otherwise be necessary where PEMFCs employ PEMs such as Nafion®.

Accordingly, an increasingly popular approach taken with PEMFCs is to focus on high temperature PEMFCs—HTPEMFCs—in which alternative polymers such as polybenzimidazole (PBI) are used on account of their high thermal stability. Unfortunately, a disadvantage with PBI is observed in its pure state is a very low conductivity of the order $10^{-12}$ S/cm. Improved conductivities have been found when PBI is doped at relatively high levels of with phosphoric acid (typically 5 to 7 moles of $H_3PO_4$ per unit of monomer of PBI) resulting in PBI—$H_3PO_4$. PBI—$H_3PO_4$ has been reported by O E Kondsteim et al. (*Energy* 32 (2007) 418-422) to possess conductivity of approximately $6.8 \times 10^{-2}$ S/cm at 200° C. with approximately 560 mol % pyrophosphoric acid (equating to about 5 molecules of $H_3PO_4$ per repeat unit within the PBI). However, a further disadvantage of PBI-based PEMs is the decrease in mechanical strength that takes place within increasing temperature and increased level of doping. Also, acid leaches out at temperatures of about 160° C.

A third PEM of potential use in HTPEMFCs is not based upon the use of a polymer but rather the use of heteropolyacids (HPAs), such $H_6P_2W_{21}O_{71}$, which has been reported to exhibit good conductivity, dependant on relative humidity K A Record et al., (*US Department of Energy Journal of Undergraduate Research*, VI (2006), 53-58); and L Wang, (*Electrochimica Acta* 52 (2007), 5479-5483)).

Polymer composites are mentioned in WO2007/082350 and are described as comprising at least one inorganic proton-conducting polymer functionalised with at least one ionisable group and/or at least one hybrid proton-conducting polymer functionalised with at least one ionisable group, and at least one organic polymer capable of forming hydrogen bonds.

There remains an ongoing need for the provision of proton exchange membranes suitable for use in (HT)PEMFCs which can operate at temperatures in excess of 100° C., and ideally, be less dependent upon the relative humidity within the (HT)PEMFC.

SUMMARY OF THE INVENTION

We have surprisingly found that optionally hydrated compositions having the formula $xXO_2 \cdot yY_2O_5$, (wherein $0.5 < x < 0.7$; $0.3 < y < 0.5$; X comprises one or more of silicon, titanium, germanium and zirconium; and Y comprises one or more of phosphorus, vanadium, arsenic and antimony), have utility as ionic conducting materials, in particular as proton-conducting materials. In particular embodiments of the invention, we have found that phosphorus silicon oxides, e.g. silicon phosphates, have utility as an ionic conducting material. Phosphorus silicon oxides and other compositions of the invention may therefore be used as a proton-exchange membrane in fuel cells enabling key transport applications. Moreover, the intrinsic conductive properties of these compositions may also be used in other technological applications, including electrolysis membranes, electrochemical sensors and electrode applications.

Viewed from a first aspect, therefore, the invention provides a composition having the formula (I):

$$xXO_2 \cdot yY_2O_5 \quad (I)$$

(wherein:
  $0.5 < x < 0.7$;
  $0.3 < y < 0.5$;
  X comprises one or more of silicon, titanium, germanium and zirconium; and
  Y comprises one or more of phosphorus, vanadium arsenic and antimony), or a hydrate thereof.

According to particular embodiments of the first aspect, the composition comprises 50 wt % or more of crystalline material.

Viewed from a second aspect, the invention provides a membrane, in particular a proton exchange membrane, comprising a composition according to the first aspect of the invention.

Viewed from a third aspect, the invention provides an electrochemical device comprising an ionic conductor that comprises a composition according to the first aspect of the invention.

Viewed from a fourth aspect, the invention provides a fuel cell stack comprising two or more fuel cells that comprise a composition according to the first aspect of the invention.

Viewed from a fifth aspect, the invention provides an article powered by a fuel cell or a fuel cell that comprises a composition according to the first aspect of the invention.

Viewed from a sixth aspect, the invention provides the use of a composition according to the first aspect of the invention as an ionic conductor in an electrochemical device.

Viewed from a seventh aspect, the invention provides a method of operating a fuel cell according to the third aspect of this invention comprising contacting the fuel cell with a reactant fuel and an oxidant whereby to generate electricity, wherein the fuel cell is operated at a temperature of up to about 200° C. and/or a humidity of less than about 50%.

Other aspects and embodiments of the invention will become evident from the discussion that follows.

BRIEF DESCRIPTION OF THE FIGURES

FIGS. 3(a) and 3(b) show SAED images of a phosphorus silicon oxide produced in accordance with Synthetic Example 1, showing a perpendicular array of the spots.

FIG. 4(b) shows a further scanning electrode microscope image of a sample of a phosphorus silicon oxide produced in accordance with Synthetic Example 1 dispersed in a matrix of PMMA (poly(methyl methacrylate)), (×14000) showing a defined hexagonal shape.

DETAILED DESCRIPTION OF THE INVENTION

Figure 1:
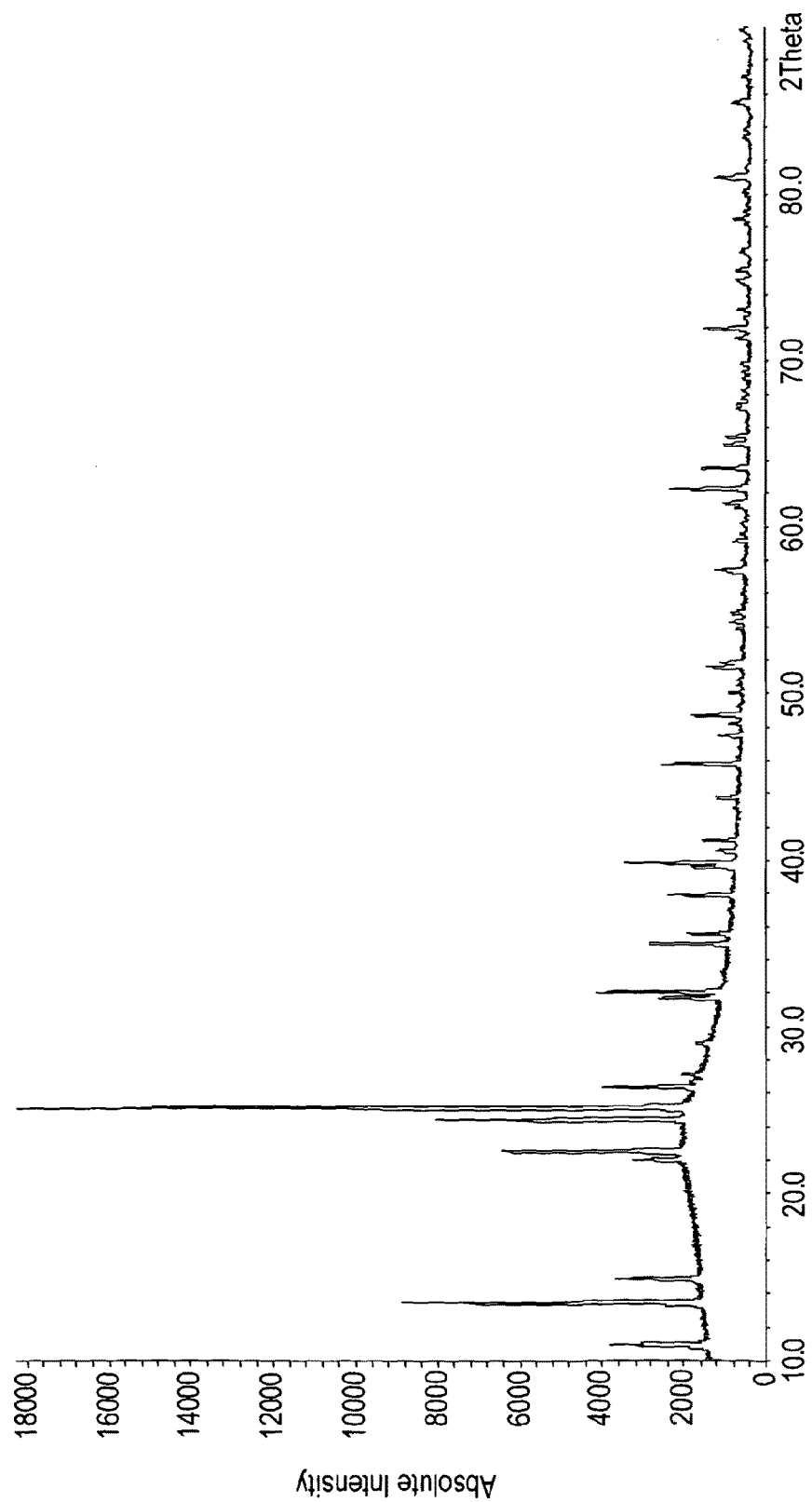
FIG. 1 shows an X-ray diffraction pattern of a phosphorus silicon oxide produced in accordance with Synthetic Example 1.

The present invention arises from the surprising finding that compositions of the formula (I) as defined herein may be used as an ionic conductor for a variety of electrochemical devices including fuel cells, electrolysis cells, electrochemical sensors and electrodes.

According to the invention, X in the compositions of formula (I) comprises one or more of silicon, titanium, germanium and zirconium. In some embodiments X comprises one or more of silicon, titanium and germanium, e.g. silicon and titanium. In some embodiments of the invention X is silicon. Y may comprise one or more of phosphorus, vanadium, arsenic and antimony. In certain embodiments of the invention the compositions have formulae wherein X is silicon and Y is phosphorus whereby to provide phosphorus silicon oxides of formula (I). The remainder of the discussion focuses on such phosphorus silicon oxides although the invention is not to be understood to be so limited.

As those of skill in the art are aware, and this convention is adopted herein, the term phosphorus silicon oxide embraces silicon phosphates and denotes a compounds or composition comprising, or that may be regarded as formally comprising, cationic silicon ($Si^{4+}$) and anionic phosphate units although there is no intent through this definition to imply or insist that the a phosphorus silicon oxide is an ionic species. A phosphorus silicon oxide of formula (I) may be regarded as a framework phosphate, i.e. comprising an extended molecular network. As used herein a phosphorus silicon oxide may, and often does, comprise one or more silicon phosphorus oxides, e.g. silicon phosphates. The term phosphorus silicon oxide also embraces within its ambit silicon hydrogen phosphates and hydrates thereof and of silicon phosphates. Silicon hydrogen phosphates and hydrates thereof and of silicon phosphates may be formed upon contact of silicon phosphates of formula (I) with water, for example within a fuel cell in situ, e.g. when the material is used in a membrane in a (HT)PEMFC.

In accordance with particular embodiments of the composition of formula (I), where the composition is hydrated, the composition may comprise up to three molar equivalents of water with respect to the molar quantity of $Y_2O_5$ present. Thus such hydrates may be represented by formula (I):

$$xXO_2 \cdot yY_2O_5 \cdot wy \cdot H_2O \qquad (Ia)$$

(wherein x, X, y and Y are as defined herein; and $0<w\leq 3$).

In other words there may be wy moles of water present, i.e. up to 3y moles of water present. Typically such compositions, particularly prior to use in electrochemical devices, are considerably less hydrated than this, e.g. having a value of $0<w<1$, e.g. $0<w<0.5$.

It will be understood that reference herein to compositions of formula (I), unless the context dictates to the contrary, embrace compositions as formula (I), or hydrates thereof, e.g. compositions of formula (Ia).

Typically, phosphorus silicon oxides are made by reacting a silicon-containing material and one or more phosphoric acids. The phosphoric acid from which phosphorus silicon oxides of formula (I) may be made is not particularly limited. It may be, for example orthophosphoric acid ($H_3PO_4$), pyrophosphoric acid ($H_4P_2O_7$) or a so-called polyphosphoric acid (such as tri- or tetraphosphoric acid ($H_5P_3O_{10}$ and $H_6P_4O_{13}$ respectively). Most phosphoric acids are oxyacids of phosphorus (V) and are of formula $H_{n+2}P_nO_{3n+1}$. These typically exist in equilibrium with each other, differing in the degree of condensation, with n increasing as the water content decreases. Typically a sample of phosphoric acid will comprise a mixture of lower phosphoric acids, i.e. wherein n is from 1 to 6, typically from 1 to 4, with such mixtures frequently being characterised by a so-called total phosphorus content, typically as a percentage with respect to pure phosphoric acid. Since the formula $H_{n+2}P_nO_{3n+1}$ dictates that phosphoric acids having n>1 have a phosphorus content (by weight) greater than orthophosphoric acid, mixtures of phosphoric acids generally have phosphorus contents with of more than 100%.

Phosphoric acid mixtures having phosphorus contents of between about 100% and about 120% may be used in the preparation of phosphorus silicon oxides of formula (I). Pyrophosphoric acid may be conveniently used as the phosphoric acid component when making phosphorus silicon oxide of formula (I). An appropriate phosphoric acid or mixture of phosphoric acids may be used as such or, optionally, generated in situ, e.g. by contact between phosphorus pentoxide and a phosphoric acid, e.g. orthophosphoric acid, as descried in U.S. Pat. No. 3,611,801.

Alternatively, and in certain embodiments of the invention, no phosphoric acid may be employed as the source of phosphorus, and the phosphorus silicon oxide made by heating a mixture of silica and phosphorus pentoxide ($P_2O_5$). Also, as is known to those of skill in the art, since $P_2O_5$ can be made from precursors such as mono-, di- or triammonium phosphate ($[(NH_4)_2H_{(3-z)}]PO_4$, wherein z=1, 2 or 3 respectively) it will be understood that phosphorus silicon oxide can be made by heating a mixture of silica and one or more of these ammonium phosphates.

The material with which the phosphoric acid is reacted may be any convenient silicon-containing material. Examples of such materials are known to those in the art and include siliceous (i.e. $SiO_2$-containing) materials known as diatomaceous earth or kieselguhr (diatomaceous earth and kieselguhr are often used interchangeably) and other natural or synthetic silica. Non siliceous materials (e.g. silicon chloride or tetraethyl orthosilicate may also be used). If used, a siliceous material will often comprise between 90 and 100 wt % silica. Natural silicas, that is to say silica-containing compositions, typically contain up to about 90 to 95 wt. % silica. High purity silicas, with silica contents of between about 99 and about 100 wt. %, suitable for use in electronics applications, are available commercially. Alternatively, the silicon-containing material may comprise an aluminium silicate such as various clays, including kaolin. Particularly surprisingly, it has been found that the silicon-containing material from which phosphorus silicon oxide of formula (I) is made may be a silicon-containing glass such as Pyrex or other laboratory or other glassware. More typically, however, the silicon-containing material will be provided by way of specific provision of a suitable (typically siliceous) material, typically as a form of silica, usually powdered.

In certain embodiments of the invention, the silicon-containing material, and thus compositions comprising compositions of formula (I), may comprise aluminium, for example in the form of aluminium oxide.

The compositions of formula (I), be they phosphorus silicon oxides or otherwise, may alternatively or additionally comprise—i.e. be chemically doped with—one or more of any of the following elements: boron, sulfur, arsenic, aluminium, titanium, antimony, tin, germanium and indium. These may be introduced by contact of the precursors to the composition of formula (I), e.g. with an appropriate compound comprising of one of these elements, for example as described in U.S. Pat. No. 3,112,350, or by introducing the element in elemental form. Alternatively the composition of formula (I), e.g. phosphorus silicon oxide, can be doped with an amount of one of these elements, either in elemental form or as part of a compound comprising it.

One example of a way of introducing an additional element into a phosphorus silicon oxide is by substituting a proportion of siliceous material for titanium dioxide since titanium dioxide is known to be able to form titanium phosphorus oxide in an analogous manner to the way in which phosphorus silicon oxide may be formed.

Another example of a way of introducing an additional element into a phosphorus silicon oxide is by substituting a proportion of siliceous material for tin oxide. In this way, $SnP_2O_7$ may be formed in accordance with the description in US patent application publication number US 2005/0221143. Alternatively, $SnP_2O_7$ (or another phosphorus tin oxide) may be added as such.

Examples of syntheses of phosphorus silicon oxides may be found in T R Krawietz et al. (*J. Am. Chem. Soc.* 1998, 120, 8502-8511).

In particular embodiments of the invention the phosphorus silicon oxide may be formed by calcining a mixture comprising a phosphoric acid component and silica. According to these and other embodiments a phosphorus silicon oxide may be made that comprises silicon orthophosphate and/or silicon pyrophosphate. Typically these materials will be in the form of an intimate mixture.

Despite the commercial importance of phosphorus silicon oxides, and the description in the art of a number of silicon phosphate-containing compositions, mainly in the field of catalysis, a full structural characterisation and understanding of the various silicon phosphates has proven stubbornly elusive.

$Si_5P_6O_{25}$ was the formula attributed to silicon orthophosphate by D. M. Poojary et al. (*Inorganica Chimica Acta*, 208 (1993) 23-29) after an earlier contrary description in the art by F Liebau et al. (*Z. Anorg. Allg. Chem.*, 359 (1968), 113-134) of a solid solution system of formula $Si_{1+5x}P_{4(7-x)}O_{72}$, wherein x=2.5-3.5 and the suggestion by H. Makart (*Helv. Chim. Acta*, 50 (1967), 399-405) that the formula of silicon orthophosphate was $Si_3P_4O_{16}$ ($Si_3(PO_4)_4$). In particular, Poojary et al. explicitly concluded that silicon orthophosphate does not exist as a solid solution system as postulated by Liebau et al.

Phase diagrams of the $SiO_2$—$P_2O_5$ system have been presented (see Phase *Equilibria diagrams, phase diagrams for ceramists*, volume XI oxide, Robert S. Roth, compiled at the National Institute of Standards and Technology, edited and published by *The American Ceramic Society*, pp 173-174) claiming various crystal structures, e.g. cubic, hexagonal, tetragonal, monoclinic, tridymite and cristobalite across the compositional range. Associated findings relating to one of the reported phase diagrams implied, through depiction of a line phase, that a solid solution series around the composition $Si_5P_6O_{25}$ did not exist, consistent with the later findings of Poojary et al. (infra).

Without wishing to be bound by theory, we postulate that inclusion of water to form particularly hydrated silicon orthophosphate may have contributed to the difficulty in its characterisation.

The present invention is based, in part, on our finding that silicon orthophosphate is part of a solid solution system based around the composition $Si_5P_6O_{25}$, i.e. is based upon the $Si_5P_6O_{25}$ structure. $Si_5P_6O_{25}$ may be alternatively represented as $Si_5O(PO_4)_6$ and $5SiO_2.3P_2O_5$. We reached this conclusion by controlling the ratio of silicon to phosphorus in phosphorus silicon oxides prepared by us, made e.g. from silica and pyrophosphoric acid, or silica and an ammonium phosphate, whereby to vary the proportion of the resultant product from $5SiO_2.3P_2O_5$ to $5SiO_2.4.5P_2O_5$, and by plotting cell volume data extracted from X-ray diffraction patterns against composition. By plotting the data in this way, we have shown there to be a linear relationship (see FIG. 14) between cell volume (and/or lattice parameter) indicating the existence of a solid solution series based on $Si_5P_6O_{25}$, in accordance with Vegard's rule. Vegard's rule states that there is a linear relation between lattice parameters and composition of solid solution alloys expressed as atomic percentage. In particular our data are suggestive of a solid solution series existing around a central composition $Si_5P_6O_{25}$, in particular of compositions having the formula (I), wherein X=silicon and Y=phosphorus.

An alternative series of compositions based upon the $Si_5P_6O_{25}$ structure may be represented by formula (II):

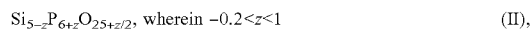

$Si_{5-z}P_{6+z}O_{25+z/2}$, wherein $-0.2<z<1$     (II), and hydrates thereof.

It will be understood from the discussion herein that the invention also provides variants of formula (II) of formula (III):

$X_{5-z}Y_{6+z}O_{25+z/2}$,     (III), and hydrates thereof,
wherein $-0.2<z<1$ and X and Y are as hereinbefore defined.

It will be understood that the discussion herein in relation to hydrates of formula (I) applies mutatis mutandis to hydrates of formula (III) (and (II)). Thus by representing formula (III) as

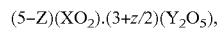

$(5-Z)(XO_2).(3+z/2)(Y_2O_5)$, typical hydrates may comprise $w(3+z/2)$ water molecules, wherein w is as hereinbefore defined.

Thus compositions of formulae (I) and (III), e.g. of formula (II), of phosphorus silicon oxides are provided in accordance with the various aspects of the present invention that comprise regions of silicon orthophosphate having a composition of formulae (I) or (III), wherein X is silicon and Y is phosphorus. Additionally or alternatively the phosphorus silicon oxides according to the various aspects of the present invention comprise silicon pyrophosphate. Where both silicon pyrophosphate and silicon orthophosphate are present these may be in intimate admixture, generally as a consequence of the manner in which the phosphorus silicon oxides have been made.

As is known in the art, phosphorus silicon oxide may be prepared by calcining a mixture comprising the desired silicon and phosphorus sources. By this is meant that a phosphoric acid (i.e. one or more phosphoric acids) or other phosphorus source, such as $P_2O_5$ or a precursor therefor, such as the ammonium phosphates described above, and a silicon-containing material are contacted and the mixture heated at an elevated temperature whereby to provide the desired phosphorus silicon oxide. Suitable temperatures may be in the region of between about 200 to about 500° C. and for a period of between about 1 hour and 2 weeks.

In certain embodiments of the invention, heating under Dean-Stark conditions whereby to allow the removal of moisture may be convenient.

In certain embodiments of the invention it is convenient to dry the silicon-containing material from which the phosphorus silicon oxide is made prior to contact with the phosphorus-containing component and subsequent heating of the mixture. For example, where a siliceous substrate e.g. silica, is used as the substrate, this may be dried at a temperature of from about 500 to about 1000° C., e.g. at about 800° C., for an extended period, e.g. from about 30 minutes to 24 hours of more, typically between about 1 and 4 hours, to allow removal of any residual moisture and any absorbed gases.

In certain embodiments of the invention, the silicon-containing material from which it is desired to form the phosphorus silicon oxide may be fine, free-flowing form. In such embodiments of the invention it may be convenient to add a volatile organic solvent, such as an alcohol (e.g. ethanol) to the silicon-containing material to allow it to be mixed with the phosphoric acid component without loss through the formation of a dust.

In other embodiments of the invention, an appropriate amount of one or more ammonium phosphates may be mixed with a siliceous substrate (e.g. silica) and the mixture decomposed in a crucible, e.g. made of alumina, by heating to above 200° C. The resultant product may be removed, ground and heated slowly to a temperature of from above 500 to about 1000° C., i.e. about 800° C., to obtain the desired product—the pure $Si_5P_6O_{25}$ phase. Such products are highly crystalline, i.e. contain large crystallites.

Alternatively, smaller crystallites (e.g. nanocrystalline compositions as described hereinafter) may be prepared by this method, and by other methods and embodiments described herein (e.g. those beginning with silica and ammonium phosphate reactants), by calcining at lower temperatures, such as about 200 to about 500° C. and for a period of between about 1 hour and 2 weeks. Judicious variations of the time and duration of heating permit variation in the resultant composition within the ability of those of skill in the art.

In certain embodiments of the invention, small quantities of either acid or base may be added to the mixture comprising the silicon-containing material and phosphorus-containing component from which the phosphorus silicon oxide is formed. These may be added prior to initiation of the reaction between the phosphorus-containing component and the silicon-containing material and/or additional quantities may be added after initiation of the reaction.

Examples of suitable acids include mineral acids such as hydrochloric, nitric and sulfuric acid, for example sulfuric acid. Where base is used as the catalyst, this may be, for example, ammonia, which may be added as an aqueous solution. Other bases (such as KOH, NaOH) may be used. The amount of catalyst is typically added in an amount of between 0.01 to 5% on a molar basis relative to the molar quantity of pyrophosphoric acid component used.

After mixing by any convenient method, for example stirring, shaking or sonicating, the mixture of components, which is typically in the form of a gel-like slurry, is then heated, typically to a temperature of between 300 and 500° C. for a period of time between 1 and 6 hours.

Generally, it has been found convenient to heat the mixture in a two-stage process involving initial heating to a temperature of between about 100 and 200° C. for a period of time between 1 and 6 hours. This has the effect of partially drying the slurry resultant from contact of the components submitted to the reaction, prior to the temperature being raised further. This can be advantageous in allowing a greater degree of homogeneity to be achieved prior to the more extreme heating and lessens the likelihood of bumping (bubbling or splashing) of the mixture (which is extremely corrosive).

After the heating is finished, the resultant product—the phosphorus silicon oxide—is cooled, which may be usefully effected in an inert atmosphere provided by a blanket of nitrogen or argon gas, for example. Alternatively, in certain embodiments of the invention, the product resultant from calcination is cooled to a temperature of between about 80° C. and about 180° C. and treated with a mixture of air and water vapour in accordance with EP-A-570070. We have found that the compositions of the invention, including compositions of formulae (I) and (III) and compositions otherwise based upon the $Si_5P_6O_{25}$ structure are generally crystalline (in particular, comprise more than 50 wt % or more of crystalline material, e.g. up to about 100 wt % of crystalline material) but that, notwithstanding this, the compositions serve as efficient proton conductors, e.g. in (HT) PEMFCs.

In certain embodiments of the invention the compositions are nanocrystalline, by which is meant that the compositions comprise crystalline material (e.g. more than 50 wt % of nanocrystalline material, e.g. up to 100 wt % nanocrystalline material) having at least one dimension of a size between about 0.1 to 100 nm, e.g. about 1 to above 50 nm. Typical nanocrystalline compositions have one dimension of from about 1 to about 5 or 10 nm, e.g. about 3 or 4 nm. The compositions, in nanocrystalline form or otherwise, may constitute or be part of nanoparticles, nanostructured materials, thin films, amorphous phases or ceramics.

It is to be understood herein that references to crystalline material embrace nanocrystalline material and that where a composition comprises more than 50 wt % of crystalline material, this may be made up of material that is nanocrystalline and/or comprising larger crystallite-sized material and non-nanocrystalline material where nanocrystalline indicates at least one dimension of 10 nm or less).

The phosphorus silicon oxide may be pressed into pellets, or ground into fine powders, (e.g. by ball-milling, typically followed by drying (e.g. from 1 to 24 hours at a temperature from about 50° C. to about 150° C.) allowing formation into a membrane for use as an ionic conductor, e.g. electrolyte membrane, for various applications.

Desired quantities of the materials from which the phosphorus silicon oxide (including the phosphorus-containing component (e.g. phosphorus pentoxide or a precursor thereto) and the silicon-containing material) are mixed. Typically the phosphorus-containing component results in more than 50% by weight of the phosphorus silicon oxide produced, often between about 60 and 80% by weight.

In particular embodiments of the invention, the phosphorus silicon oxide is made from a siliceous material, in particular silica, and a phosphorus-containing component, in particular phosphorus pentoxide, or a precursor thereto. In such embodiments, it is possible to control the stoichiometric outcome of the subsequent reaction by controlling the stoichiometry of the silica and phosphorus-containing component submitted to the phosphorus silicon oxide-forming reaction, e.g, to control the stoichiometry of any silicon orthophosphate.

In particular embodiments of the invention, which are illustrative and non-limiting, silica and pyrophosphoric acid are used as the materials from which the phosphorus silicon oxide is made. Control over the stoichiometric ratios of these or other materials as described in the examples section below allows the constitution of the resultant phosphorus silicon oxide to be controllably varied, e.g. to control the stoichiometry of any silicon orthophosphate.

As described hereinbelow, a phosphorus silicon oxide is formed from a mixture comprising an inorganic, typically siliceous, support and a phosphoric acid component. In many embodiments, as is known in the art, the essential characteristics of the phosphorus silicon oxide are provided by the silicon-containing, typically siliceous, material and the phosphorus-containing component. For this reason such phosphorus silicon oxides may be considered to be obtainable from mixtures consisting essentially of these components and in particular a silica and a phosphoric acid, such as pyrophosphoric acid (or a mixture of phosphoric acids and pyrophosphoric acid) or phosphorus pentoxide (or a precursor thereto, such as an ammonium phosphate) and optionally one or more of boron, sulfur, arsenic, aluminium, titanium, antimony, tin, germanium and indium as described infra.

Phosphorus silicon oxides, in particular those which comprise regions of $Si_5P_6O_{25}$ and variants thereof (as described herein, e.g. of formulae (I) or (III), wherein X is Si and Y is P) have been found to have ionic conductivities as high as $10^{-2}$ to $10^{-1}$ $Scm^{-1}$ over a temperature range from ambient (about 20° C.) up to about 250° C. Whilst the presence of water increases the ionic conductivity of phosphorus silicon oxide (e.g. $Si_5P_6O_{25}$-containing and related materials), good levels of conductivity are observed even at very low water concentrations (e.g. <5% by volume in gas). Phosphorus silicon oxide has been found to be essentially insoluble in water. Crystalline forms of $Si_5P_6O_{25}$ are known to be stable to temperatures in excess of 800° C. All of these properties make $Si_5P_6O_{25}$ and variants thereof, e.g. of formulae (I) or (III), wherein X is Si and Y is P, a highly useful ionic conductor for various electrochemical devices including fuel cells, electrolysis cells, electrochemical sensors and in electrode applications.

In accordance with certain aspects of the invention, the phosphorus silicon oxide referred to in the various aspects of the invention comprises crystalline or amorphous, typically crystalline, regions of $Si_5P_6O_{25}$ and/or $SiP_2O_7$. A synthesis of $Si_5P_6O_{25}$ (to >95% purity) is taught by T R Krawietz et al. (infra) by reaction between silica and phosphorus pentoxide. Typically, crystalline regions of $Si_5P_6O_{25}$ within the phosphorus silicon oxide are in intimate mixture with $SiP_2O_7$.

In the discussion that follows, emphasis is placed upon the use of phosphorus silicon oxide compositions (i.e. of formulae (I) and (III)) in fuel cells, but it is to be understood that the invention is not to be considered to be so limited, and embraces compositions of other formulae in other applications, where high ionic conductivity is advantageous.

In certain embodiments of the invention, phosphorus silicon oxide is present in a membrane suitable for use as a proton exchange membrane in a fuel cell, e.g. a HTPEMFC. When incorporated into a membrane, for use in a fuel cell or otherwise, such a membrane is typically approximately about 1 to about 500 μm thick, e.g. about 10 to about 250 μm thick, typically about 10 to about 100 μm thick.

Phosphorus silicon oxide-containing membranes useful in the present invention may be provided that comprise other polymers, typically organic polymers, not having proton-conducting properties, e.g. neutral polymers such as poly (alkylenes) (e.g. poly(ethylene) or poly(propylene)), PVC, poly(vinyl alcohol) PVA, PEG, poly(vinyl benzene) (PVB), Polylmide, PTFE and PVDF. Such polymers are advantageously, like, phosphorus silicon oxide, stable at high temperatures. By neutral polymer is meant a polymer without cations or anions that are covalently bound to the polymer. Typically, such neutral polymers are non-polar (and so are not hydrophilic polymers such as PEG and PVA). An example is PTFE.

Alternatively, phosphorus silicon oxide-containing membranes useful in the present invention may be provided that comprise other polymers, typically organic polymers, having proton-conducting properties. Such polymers are known in the art and include, for example sulfonated polyether ether ketone (PEEK), PTFE or other polymers, e.g. poly(acrylic acid), optionally in the interstices of which zirconyl phosphate is deposited, as described, for example, in U.S. Pat. No. 5,849,428. Such polymers are advantageously, like, phosphorus silicon oxide, are stable at high temperatures.

By working with mixtures of proton-conducting phosphorus silicon oxide and other polymers that have for example useful mechanical properties desirable combinations of mechanical and functional properties may be realised through techniques with which those of skill in the art are readily familiar, such as casting from dispersions whereby to provide membranes of appropriate thickness and other dimensions. Alternatively, mixtures of composition of formula (I) according to the present invention and appropriate other polymers may be ball-milled together and subsequently hot-pressed.

According to particular embodiments of the invention, phosphorus silicon oxide-containing membranes may be provided that have a porous, solid structure made of a polymer having a suitable, porous self-supporting structure, in the pores of which the silicon phosphorus oxide of the invention may be formed in situ. An example of a polymer having a suitable, porous self-supporting structure is porous PTFE commercially available from Porex Membrane (Alness, Scotland) such material, optionally after surface-modification (e.g. by boiling in an alcoholic solvent such as methanol and/or treatment with a mixture of hydrogen peroxide and sulfuric acid), may be treated with suitable precursor to the silicon phosphorus oxide (e.g. as described herein, for example, silicon chloride or tetraethyl orthosilicate as the silicon source) and pyrophosphoric acid/phosphoric acid as the phosphorus source. These constituents may be added simultaneously or consecutively and the silicon phosphorus oxide of the invention generated in the pores of the PTFE by subsequent heat-treatment as described herein.

In particular embodiments of the present invention the phosphorus silicon oxide of the invention is used as an ionic conductor, i.e. as a proton conductor in a fuel cell.

The skilled person will be aware of many of the fundamental principles and features of a fuel cell, for example, that these are devices that generate electricity upon oxidation of the reactant fuel supplied into an anode side of the fuel all when an oxidant is introduced to the cathode side. The electricity generated by this oxidation is harnessed by channelling the electrons generated upon oxidation of the reactant fuel through an external circuit, the anode and cathode of the fuel cell being connected by this external circuit and disposed on either side of an electrolyte. In other words, it will be understood that a fuel cell as described herein comprises an anode and a cathode in electrical communication through an external circuit, the anode being provided with a catalyst capable of catalysing the oxidation of the fuel and the cathode reduction of the oxidant. Additionally, fuel cells in accordance with the present invention are provided with an electrolyte, which comprises a phosphorus silicon oxide. This membrane, as with membranes in all fuel cells, serves to physically separate the oxidation and reduction reactions that take place at the anode and cathode. Typically, as is known in the art, where the electrolyte membrane is a solid, it together with the electrodes and associated catalysts make up what is referred to in the art as the so-called membrane electrode assembly (MEA). Typical the electrode material of the MEA comprises carbon (e.g. carbon cloth, felt or carbon paper) in or on which the catalyst is applied.

In addition, there are provided inlets to and outlets from each of the anode and cathode regions of the fuel cell as appropriate allowing the introduction of fuel and oxidant and exit of products formed from oxidation of the fuel and reduction of the oxidant. All of the foregoing features, including the provision of an electrolytic membrane as such disposed between the cathode and the anode, are standard to all fuel cells and so known to those of a skill in the art. Accordingly, neither a detailed description of these components, nor the manner in which a fuel cell is constructed, are set forth herein.

A characteristic feature of the relevant aspects of the present invention is the provision of a membrane comprising a phosphorus silicon oxide. The fuel cells of, and used according to, the present invention are thus distinguished from the fuel cells in which a liquid phosphoric acid electrolyte is present.

At the anode, typically hydrogen will be supplied although fuel cells known in the art operate by supply of other materials such as methanol.

At the cathode, the oxidant may be any oxygen-containing species that can provide hydroxide anions upon reduction. Conveniently, and typically, the oxidant may be oxygen itself, and may be conveniently supplied as air. Alternatively, purified oxygen may but need not necessarily be used. The oxidant may be gaseous or liquid.

As is known in the art, a fuel cell stack is a plurality of fuel cells configured consecutively or in parallel, so as to yield either a higher voltage or allow a stronger current to be drawn. The present invention contemplates the use of fuel cell stacks in practising the methods and according to the other embodiments of the present invention.

The present invention is thus of utility in allowing generation of electricity for supply to and/or powering a variety of articles, which may be stationary or non-stationary. The device may or may not, but typically does, comprise the fuel cell, or fuel cell stack, operated according to the present invention. Stationary devices may be non-portable devices such as fixed machinery or, more typically, portable devices such as mobile telephones, digital cameras, laptop computers or portable power packs where use of the present invention may allow the replacement or complementing of existing battery technology.

In particular embodiments of the invention the methods may be used to power non-stationary devices such as vehicles, e.g. cars. The ability to operate at high temperatures (up to at least 200° C., e.g. from about 80 or 120° C. to 160° C.) without a need for water management represents a particular advantage of the invention. In particular the invention permits the application of the compositions described herein, e.g. in (HT)PEMFCs at much lower humidities (e.g. from about 0% to about 50% humidity) than has hitherto been achievable with PEMs. Proton conductivity can be achieved with this invention at humidities of less than 50%. In particular, since automotive air-cooling systems can effectively maintain temperatures of 130 to 140° C., the use of compositions of this invention as a proton conducting material in PEMFCs can obviate the need for specific cooling on account of the membranes typically used in PEMFCs. Further examples of specific devices of the invention include rockets and other applications in aeronautics.

The invention is illustrated by the following non-limiting examples.

Characterisation Techniques

Several techniques such as X-Ray Diffraction (XRD), Transmission Electron Microscopy including Selected Area Electron Diffraction (SAED) and High Resolution Transmission Electron Microscopy (HRTEM), Scanning Electron Microscopy (SEM), Infra-Red (IR), Solid State Nuclear Magnetic Resonance (SSNMR), Mass spectroscopy, CHN analysis, Thermogravimetric Analysis (TGA), the density and electrochemical characterisation (electrode preparation, catalyst loading, AC-Impedance and Fuel Cell (FC) testing) were performed in order to evaluate the utility of phosphorus silicon oxide as an active material for PEMFC electrolyte.

XRD

X-ray powder diffraction data were collected on a STOE StadiP diffractometer (Cu $K_{\alpha 1}$ radiation). XRD analyses were performed using STOE software.

SAED-HRTEM

Selected Area Electron Diffraction (SAED) patterns and high resolution transmission electron microscopy (HRTEM) picture were collected using a JEOL 2011 electron microscope at 200 kV and equipped with a side entry sample holder (±20° tilt). The specimens were prepared by putting droplets of suspension of the material in acetone on the holey carbon coated film supported by a copper grid.

SEM

The surface, the porosity and the morphology of particles of the electrolyte material were observed under microscopy by SEM using a JEOL 5600 where gold was sputtered at the surface of the sample under high vacuum before analysis.

IR

IR spectroscopic analyses were performed on a Perkin Elmer system 2000 NIR FT-Raman spectrometer. Transmittance spectra were recorded on a thin film of the sample sandwiched between two IR plates. The spectra were measured with 4 $cm^{-1}$ resolution.

SSNMR

Direct Polarisation Magic Angle Spinning NMR (DP-MAS-NMR) experiments were carried out using Brucker spectrometer operating at a Larmor frequency of 600.27 MHz for $^1H$ and 242.99 MHz for $^{31}P$. The samples were packed in a 4 mm $ZrO_2$ rotor with a Vespel drive tip and teflon spacers and endcap. One-dimensional (1-D) direct polarisation magic angle spinning DP-MAS-NMR spectra were recorded at spinning speed of 10 kHz using a 90° pulse length of 2 µs and recycle delay of 80 s for $^{31}P$. All chemical shifts are expressed in ppm and referenced relative to $BPO_4$ for $^{31}P$.

Thermogravimetric Analysis TGA

The TGA analysis was performed on the NETZSCH TG 209 instrument with TASC 414/3 controller from 25 to 200° C. under flowing air at a rate of 35 mL/min.

Density

Density analysis was carried out on a Micromeritics AccPyc 1340, Gas Pycnometer.

Electrochemical Characterisation

Electrode Preparation

The electrodes were prepared from graphite (i.e. 100 mg) and PVDF (i.e. 30 mg). Both graphite and PVDF were mixed in a mortar and 2 thin films of ~1.3 cm diameter and 100 µm thickness were produced as electrodes.

Catalyst Loading

A suspension of platinum was prepared by mixing in ultra-sonic bath platinum ink in isopropanol. Drops of the suspension were deposited at the surface of the electrodes and dried in an oven. This process was repeated several times (i.e. 3 times) in order to build a porous Gas Diffusion Layer (GDL).

AC-Impedance

For the AC-Impedance, the active material was processed into a membrane of 2 mm thick (i.e. electrolyte). Two graphite pellets (i.e. electrode) was painted with silver ink and dried in an oven. The membrane was sandwiched between the two painted electrodes. Measurements were performed in dry and wet air atmosphere for Ac-Impedance on a hp4192A a frequency response analyser.

FC Testing

The Fuel Cell testing was performed on the Membrane Electrolyte Assembly (MEA) prepared from the membrane sandwiched between the platinum loaded electrodes. Copper meshes were used as a current collector. The test was run under wet-5% hydrogen in argon at the anode side for the Hydrogen Oxidation Reaction (HOR) and oxygen at the cathode side for the Oxygen Reduction Reaction (ORR). The experiment was performed on a Solatron SI 1287 Electrochemical Interface.

Synthetic Example 1

It was found that a phosphorus silicon oxide comprising $Si_5P_6O_{25}$ and variants thereof could be formed simply by heating pyrophosphoric acid to between 230° C. and 250° C. for around 48 hours in a glass (Pyrex) vessel in a Dean Stark apparatus. Hydrogen peroxide was present and a catalytic amounts of ammonia (or sulfuric acid). $SiO_2$ was leached directly from the glassware. Cooling and washing the resultant material (with methanol) to remove remaining catalyst affords silicon pyrophosphate materials of this family. This method is less preferred than synthetic Example 2 since it gives little control over the silicon content and clearly damages the reaction vessel. It does however serve to illustrate how easily phosphorus silicon oxide, and, in particular $Si_5P_6O_{25}$ can be made. A number of other variant methods also proved successful Synthetic Example 2: Solid State Method Very fine $SiO_2$ powder (fumed silica) was dried for at least one hour at 800° C. to remove water and other absorbed gases prior to usage.

$SiO_2$ and $H_4P_2O_7$ were weighed in the relevant stoichiometric amounts (as per Table 1 below).

Ethanol was added to the $SiO_2$ powder to prevent the loss of the very fine solid particles during mixing. A few drops of hydrochloric acid were added to the silica/ethanol to achieve partial hydrolysis of the mixture. The resulting mixture becomes a slurry on mixing.

Adding the pyrophosphoric acid and further mixing results in a gel-like slurry. Firing this gel-like slurry to 400° C. will then yield the $Si_5P_6O_{25}$ and variant materials.

It is advantageous/convenient to introduce a lower temperature pre-firing stage to dry the gel-like slurry somewhat before final firing—the pyrophosphoric acid containing slurry/gel is highly corrosive. One should avoid its sudden exposure to high temperatures that may cause it to bubble and splash onto adjacent items/surfaces.

Once made, $Si_5P_6O_{25}$ and variant materials can be pressed into pellets, ground into fine powders for incorporation into polymer supported membranes and similar. In pellet form, the crystalline materials can be sintered at temperatures up to 900° C. without material change to the x-ray diffraction patterns (i.e. are very heat stable).

Table 1: Variations in Composition

Figure 14:
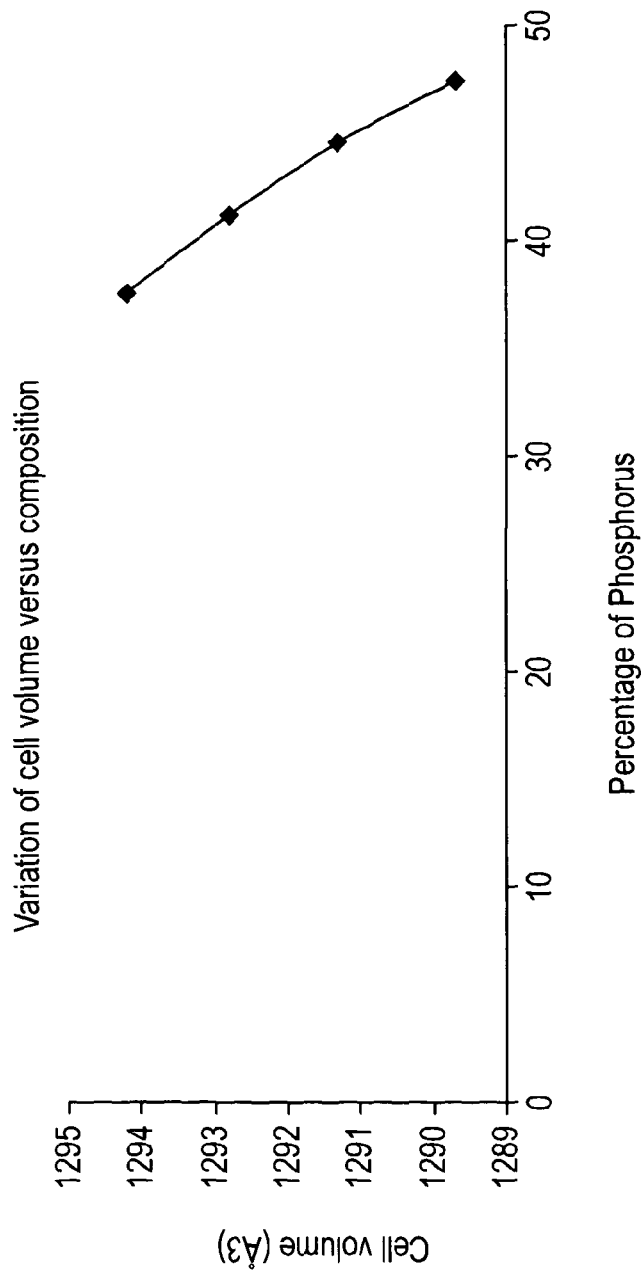
FIG. 14 depicts a graph of the volume of the unit cell of samples of phosphorus silicon oxide produced in accordance with Synthetic Example 2 with respect to their composition.

Table 1 describes some of the compositions formulated in accordance with Synthetic Example 2 above. Lattice parameters and cell volume were extracted from X-ray diffraction patterns collected from these samples. These lattice parameters and cell volume were plotted against composition. FIG. 14 shows the unit cell volume plotted against composition. The linear relationship between cell volume (and/or lattice parameter) indicates the existence of a solid solution series in accordance with Vegard's rule.

TABLE 1

Comprising evaluations of some compositions made by solid state reaction.

| Composition | Ratio Si:P | Mass of $SiO_2$ | Mass of $H_4P_2O_7$ | Temp/Time. |
|---|---|---|---|---|
| 62.5% Si:37.5% P "$Si_5P_6O_{25}$" | 5:3 | 0.6 g | 1.06 g | 400° C./4 hours |
| 58.82% Si:41.18% P "$Si_5P_7O_{27.5}$" | 5:3.5 | 0.6 g | 1.246 g | 400° C./4 hours |
| 55.5% Si:44.5% P "$Si_5P_8O_{30}$" | 5:4 | 0.6 g | 1.42384 g | 400° C./4 hours |
| 52.63% Si:47.37% P "$Si_5P_9O_{32.5}$" | 5:4.5* | 0.6 g | 1.60182 g | 400° C./4 hours |

Tables 2 and 3: Ionic Conductivity Data

Tables 2 and 3 illustrate ionic conductivity data collected from two samples. These samples were of different composition and were made in different ways. These examples serve to illustrate the conductivities that can be obtained and that such may be obtained even when the materials are made in different ways.

TABLE 2

Variation of conductivity of material made from Synthetic Example 1 with temperature in air and wet-air

| Temperature/K | Conductivity(in air) S/cm$^{-1}$ | Conductivity(in wet-air: RH = 3%) S/cm$^{-1}$ |
|---|---|---|
| 298 | 0.020 | 0.070 |
| 320 | 0.041 | 0.101 |
| 330 | 0.062 | 0.114 |
| 374 | 0.157 | 0.126 |
| 396 | 0.160 | 0.143 |
| 410 | 0.171 | 0.151 |
| 430 | 0.200 | 0.167 |

TABLE 3

Variation of conductivity of material made from Solid state method (sample 5:4.5*) described above (see Table 1) with temperature in air and wet-air

| Temperature/K | Conductivity in wet-air: (RH = 3%) S/cm$^{-1}$ |
|---|---|
| 310 | 0.013 |
| 323 | 0.014 |
| 373 | 0.012 |
| 393 | 0.014 |
| 423 | 0.013 |

Results & Discussion
XRD:

The XRD pattern of the material made according to Synthetic Example 1 (shown in FIG. 1) indicates a formation of crystalline material exhibiting very sharp peaks that can be indexed basically as a monoclinic derived from a distorted hexagonal with a cell parameters: a=9.234±0.020 Å, b=11.886±0.020 Å, c=9.100±0.020 Å and α=γ=90°, β=119.18°. The refined volume of the cell is 872.13±0.20 Å³.

SAED & HRTEM
SAED

Figure 2B:
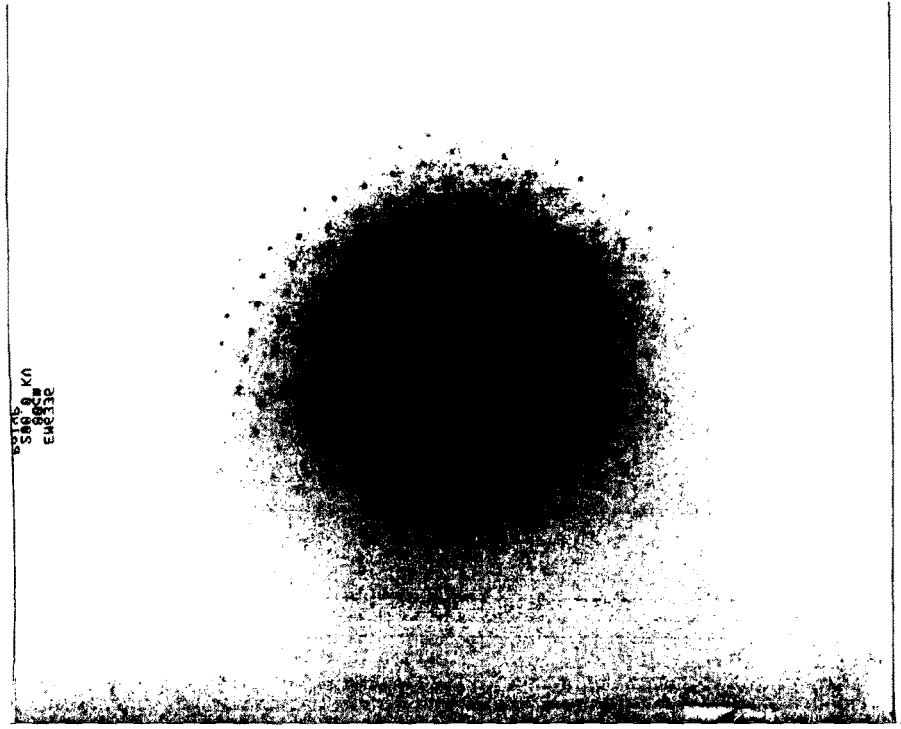
FIGS. 2(a) and 2(b) show Selected Area Electron Diffraction (SAED) images of a phosphorus silicon oxide produced in accordance with Synthetic Example 1, showing a hexagonal array to the spots.
Figure 2A:
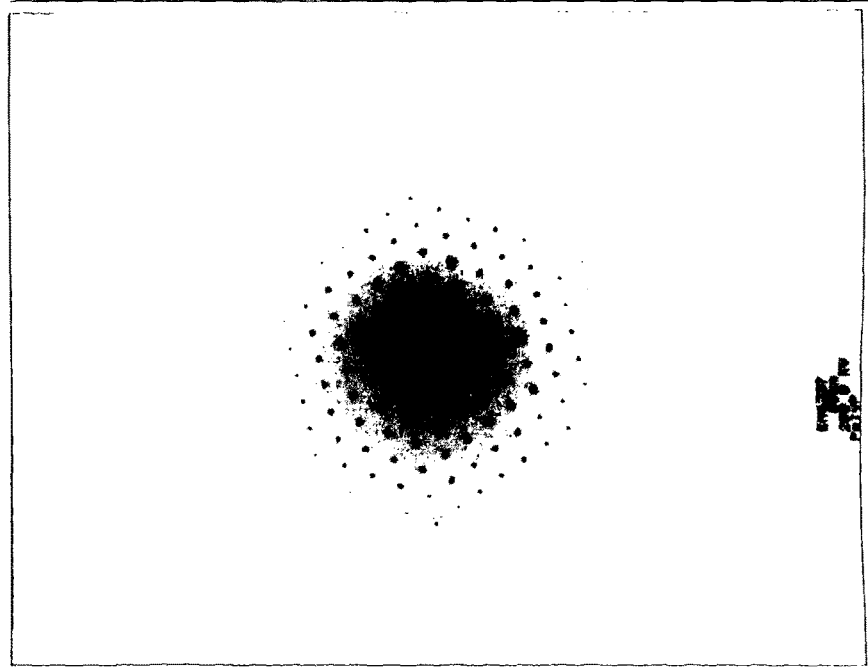

The images collected from SAED (shown in FIGS. 2 and 3) confirmed the crystallinity of the material. The d-spacing between the spots and the angles between the spots were used in correlation with the XRD pattern to determine the structure and the unit cell parameters of the material. From FIGS. 2(a) and 2(b) the spot array displayed angle close to 60° C. (~59°) whereas in FIGS. 3(a) and (b) the spot array are perpendicular.

SEM

Figure 4A:
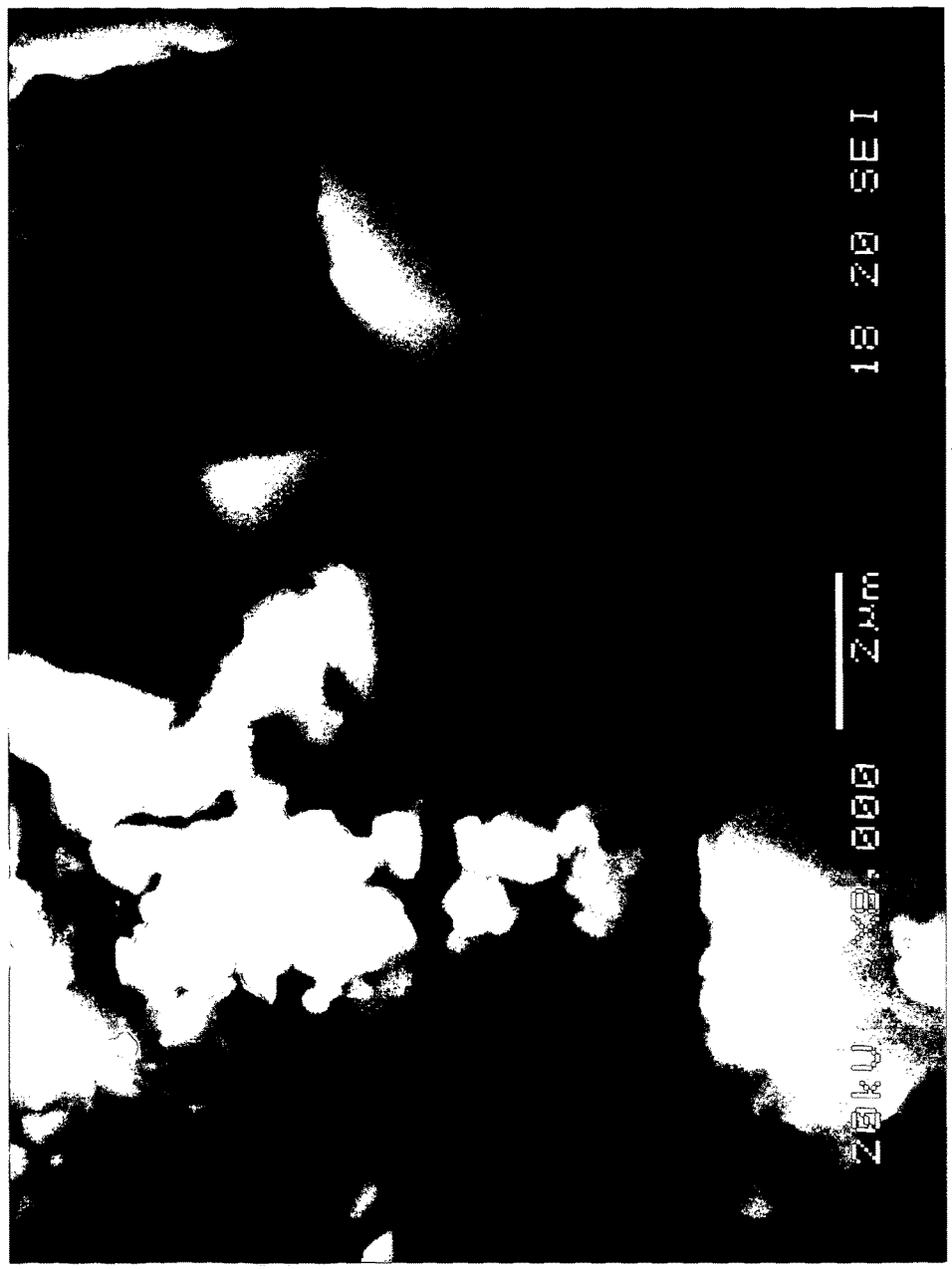
FIG. 4(a) shows a scanning electron microscopy image of a sample of a phosphorus silicon oxide produced in accordance with Synthetic Example 1 (×8000) showing the observation of agglomerated particles.

Sub-micron particles were observed from the images collected from the SEM (FIG. 4(a)). Agglomerated particles are observed in this image. When the particles are dispersed in a supported matrix such as PMMA (FIG. 4(b)), a very defined shape of the agglomerate particle can be observed exhibiting an hexagonal shape.

IR

Figure 5:
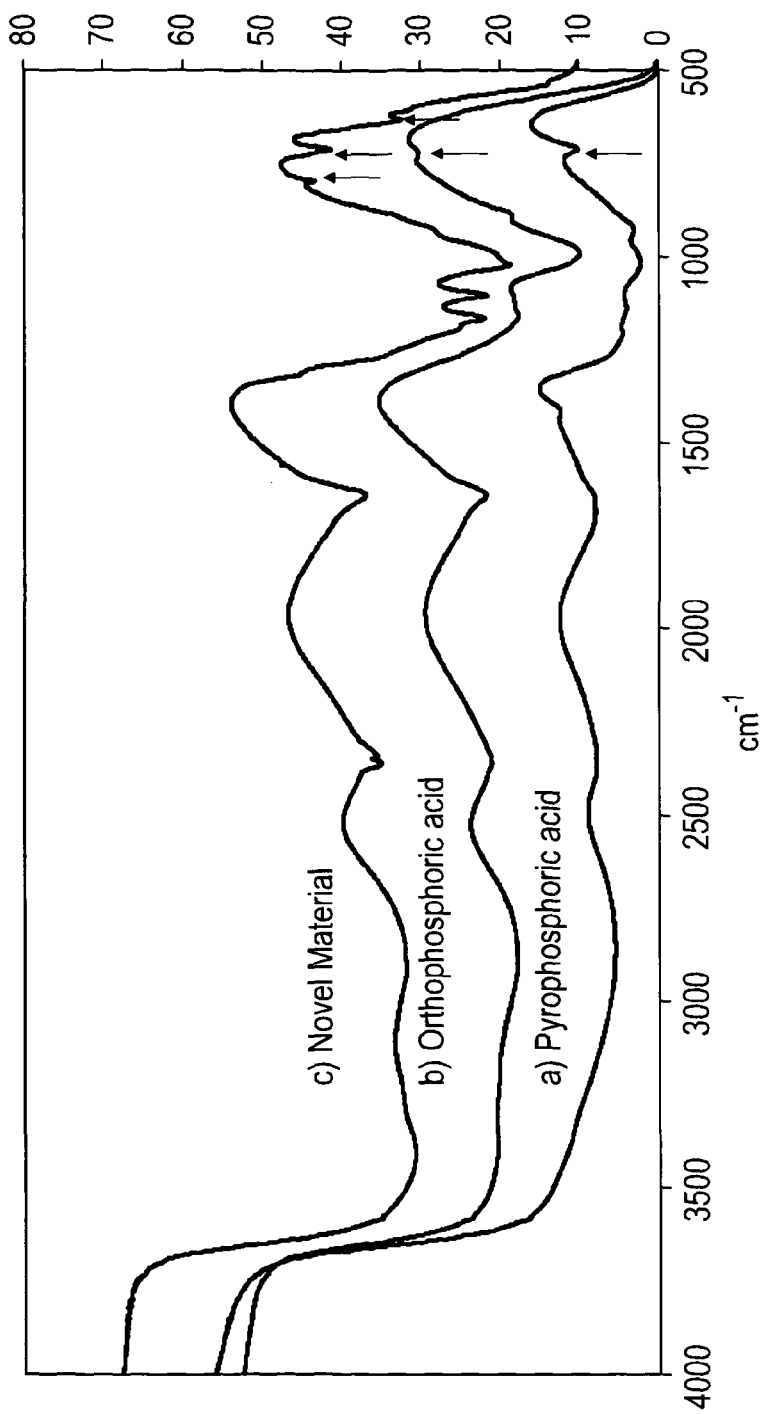
FIG. 5 shows an IR spectrum of a phosphorus silicon oxide produced in accordance with Synthetic Example 1, orthophosphoric acid and pyrophosphoric acid, with the region from 900-500 cm$^{-1}$.

For comparison IR spectrum of $H_3PO_4$, $H_4P_2O_7$ and from the product resultant from Synthetic Example 1 are shown in FIG. 5(a). From FIG. 5, between 600 to 800 cm$^{-1}$, no peak is observed for $H_3PO_4$ whereas one peak can be seen at 707 cm$^{-1}$ for pyrophosphoric acid and three peaks are observed for the phosphorus silicon oxide at 790 and 707 and 630 cm$^{-1}$ wavelength.

Figure 6:
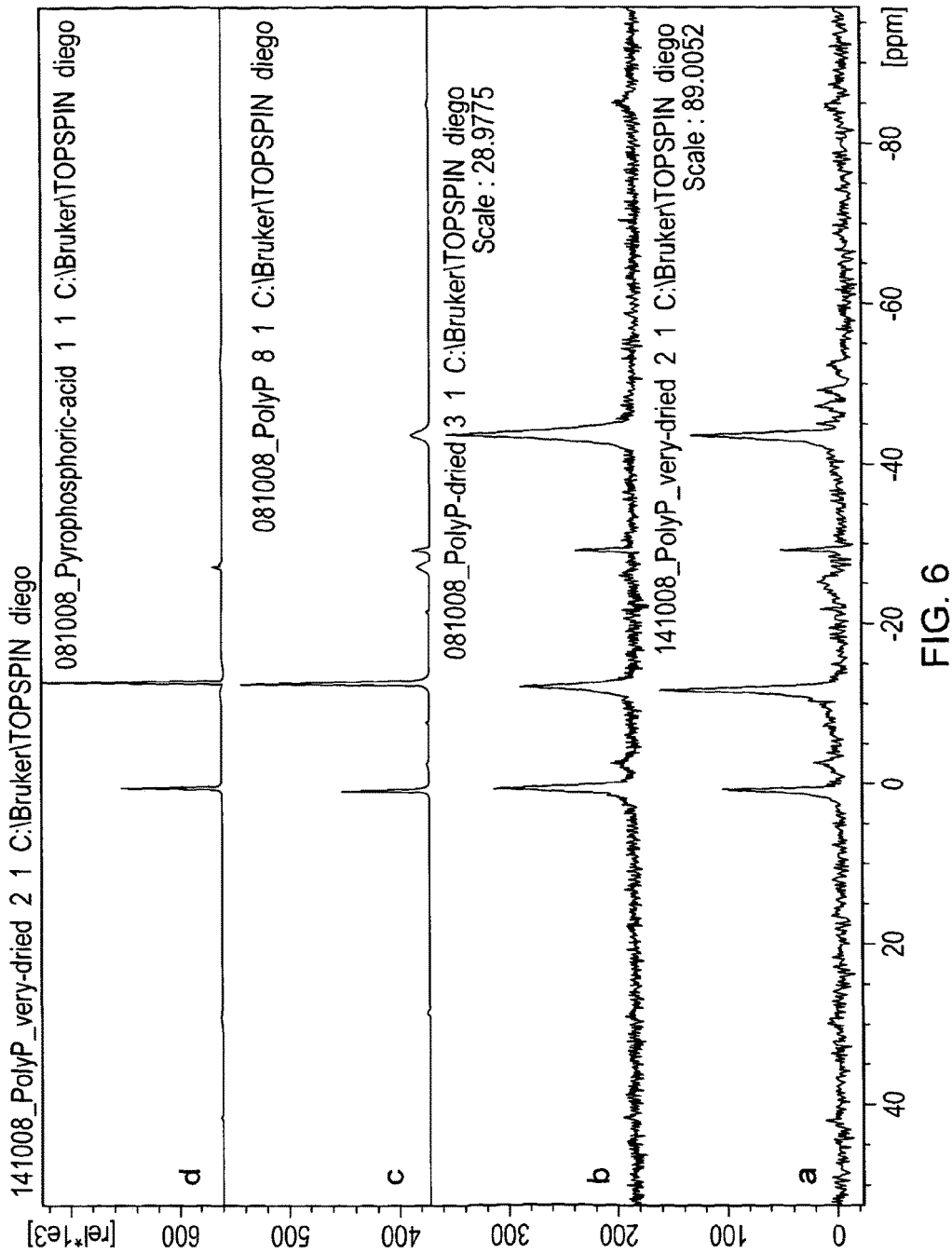
FIG. 6 shows solid state $^{31}$P NMR spectra of very dry phosphorus silicon oxide produced in accordance with Synthetic Example 1 (FIG. 6(a)), dry phosphorus silicon oxide ((FIG. 6(b)), wet phosphorus silicon oxide (FIG. 3(c)) and pyrophosphoric acid (FIG. 3(d)).

SSNMR $^{31}P$ SSNMR experiment was performed on different sample as referring to very dried active material (a), dried active material (b), wet-active material (c) and pyrophosphoric acid (d) and shown in FIG. 6.

The pyrophosphoric acid spectrum depicted in FIG. 6(d) has shown two different sites of phosphorus at about 0 ppm and at about −12 ppm with broadened in the lineshape.

Wet-active material FIG. 6(c) shows in addition to the two peaks exhibited by pyrophosphoric acid 3 small features at −26, −29 and −42 ppm. When the sample was dried out, there is no change in the peak position but all the peaks start to broaden with temperature (FIGS. 6(b) & (a)). In addition in FIGS. 6(b) & (a) spin side band were observed and are related to the peak at −42 ppm. From phosphorus NMR literature, the peak at 0 ppm was assigned to $Q^0$ species, the peak −12 ppm to $Q^1$ species, the peak at −26, −30 ppm to $Q^2$ species in different crystallographic site. The main debate concerns the peak at −42 ppm, which should correspond to $Q^3$ species. The broadening of these peaks indicates that the phosphorus atoms occupy different crystallographic sites.

Thermogravimetric Analysis (TGA)

Figure 7:
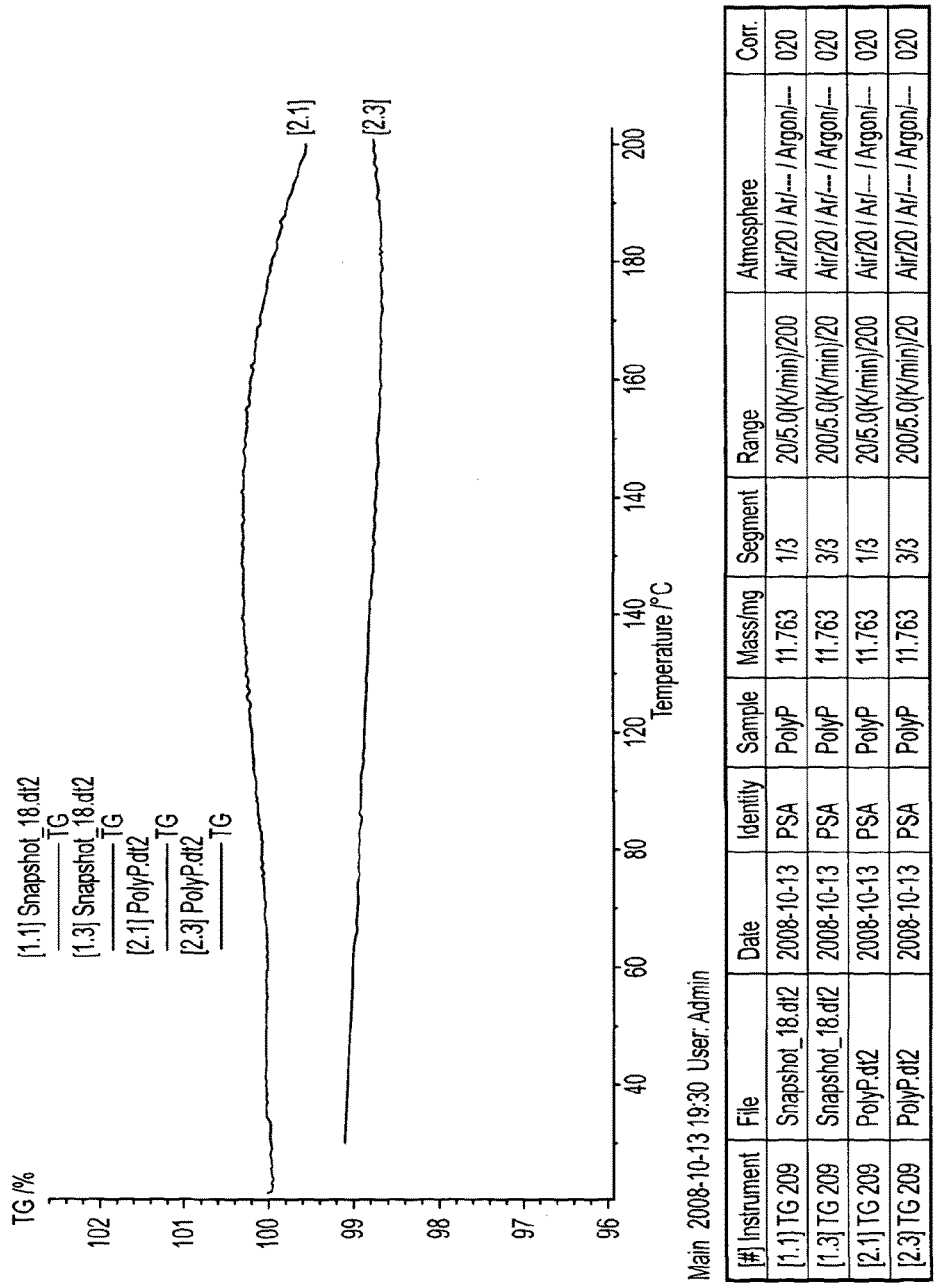
FIG. 7 shows a thermogravimetric trace obtained from heating a sample of a phosphorus silicon oxide produced in accordance with Synthetic Example 1 up to 200° C. showing no significant weight loss up to 200° C.

The thermal stability in air atmosphere is displayed in FIG. 7 and does not show any significant weight loss up to 200° C. This indicates a thermal stability up to 200° C.

Density

The experimental density measure for the material is 2.8745 g/cm³ with a standard deviation of 0.0014 g/cm³.

Electrochemical Characterisation Result & Evaluation

Figure 8:
FIG. 8 shows scanning electrode microscopy images of an electrode without platinum, expanded 500 times in (a) and 3000 times in (b); loaded with platinum expanded 500 times in (c) and 3000 times in (d).

The SEM images show the porosity of the electrode some FIGS. 8(a) & (b). The pores are vital for the gas diffusion through the electrode to allow a triple phase boundary between the gas, the electrolyte and the catalyst. This will allow the Hydrogen oxidation reaction (HOR) at the cathode and the oxygen reduction reaction (ORR) at the anode.

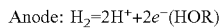
Anode: $H_2 = 2H^+ + 2e^-$ (HOR)

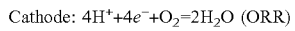
Cathode: $4H^+ + 4e^- + O_2 = 2H_2O$ (ORR)

FIGS. 8(c) & (d) show the platinum catalyst loaded at the surface of the electrode and porosity can as well as observed.

Figure 9:
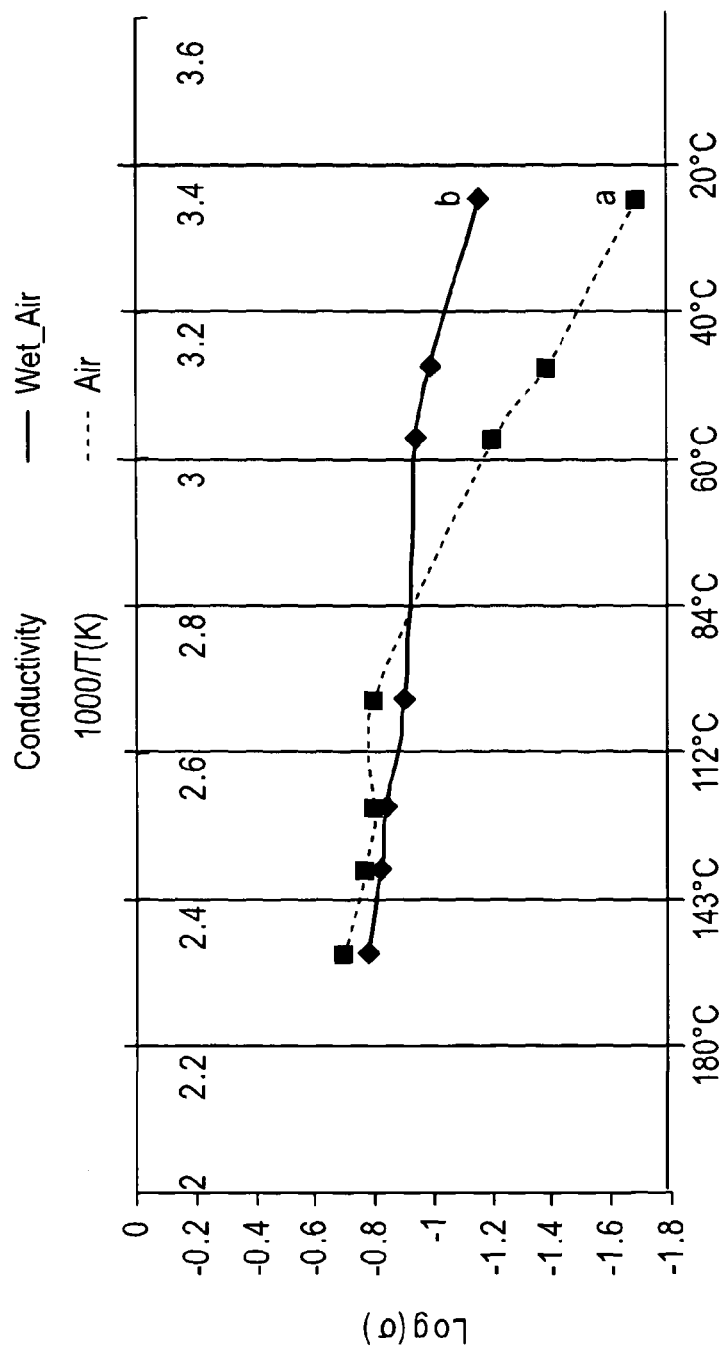
FIG. 9 shows Arrhenius plots of a sample of a phosphorus silicon oxide produced in accordance with Synthetic Example 1 in air atmosphere (FIG. 9(a)) and wet-air atmosphere (FIG. 9(b)).

The conductivity of the membrane was estimated after AC-Impedance experiment from the equation $$\sigma = (L/R*S)$$

with σ=conductivity (S/cm$^{-1}$)
L=thickness of the membrane (cm)
S=Active surface of the membrane (cm²)
and the activation energy can be obtained from the Arrhenius plots shown in FIG. 9(a) in air atmosphere and FIG. 9(b) in wet-air atmosphere.

Figure 10:
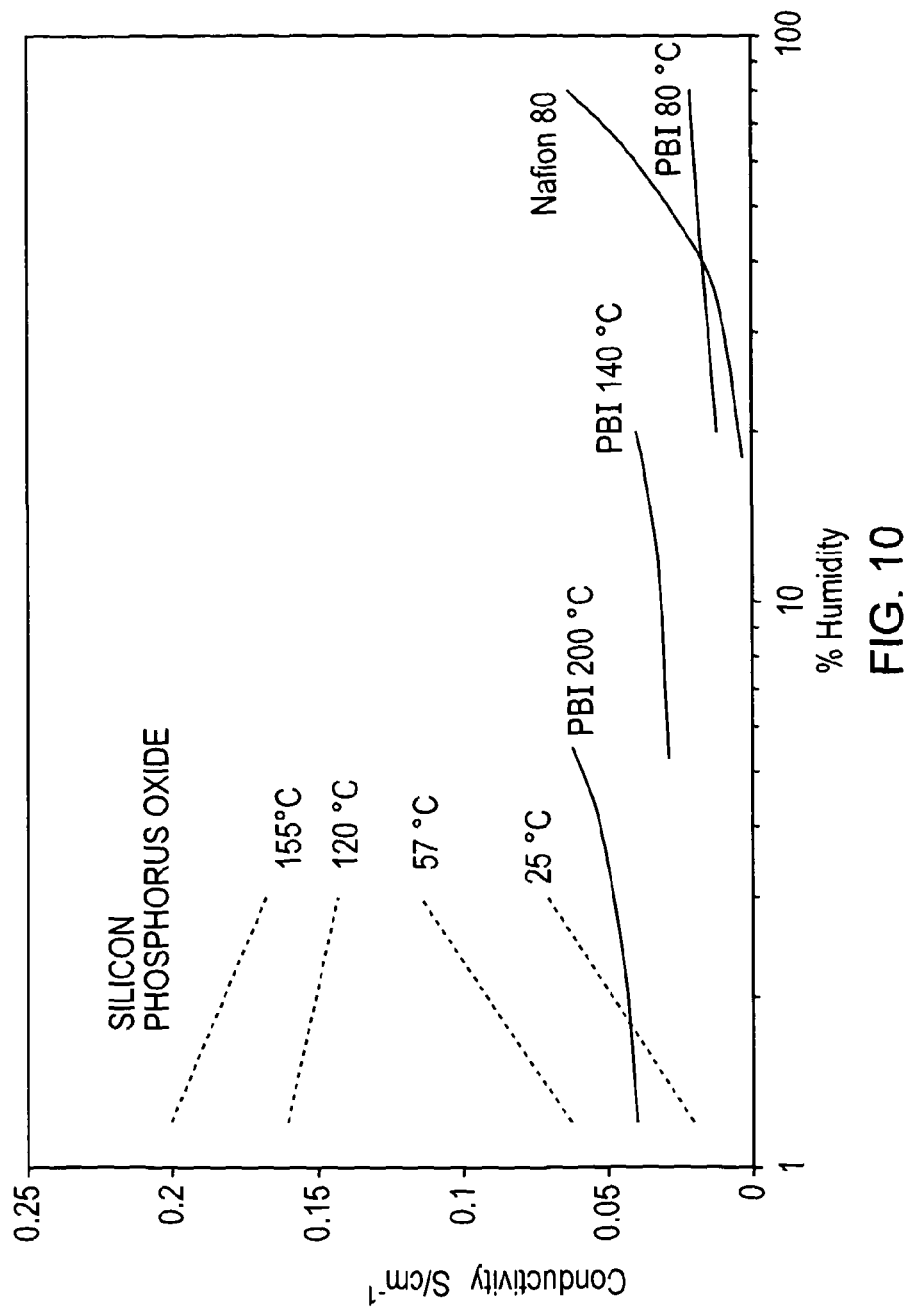
FIG. 10 shows a comparison of conductivity versus relative humidity and temperature of a sample of a phosphorus silicon oxide produced in accordance with Synthetic Example 1, Nafion® and acid-doped PBI.

The variation of the conductivity with temperature of the material is tabulated in Table 2 above. The conductivity versus relative humidity of the active material can be compared to Nafion®, and phosphoric acid doped polybenzimidazole (PBI) membrane as displayed in FIG. 10. From this it can be observed that phosphorus silicon oxide exhibits better conductivity with temperature and is water (humidity) independent as compared to Nafion® and phosphoric acid doped-PBI for conduction.

Figure 11:
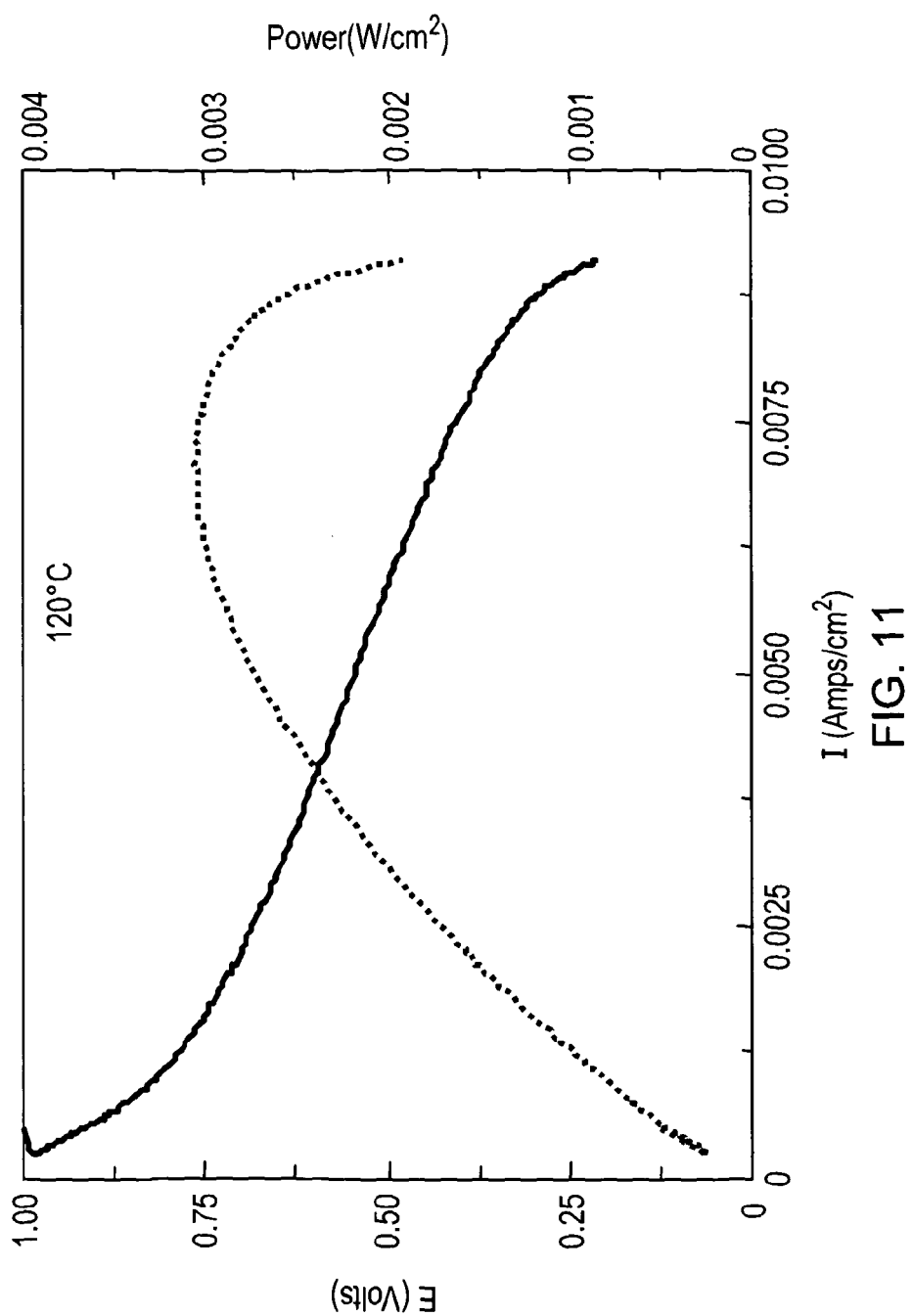
FIG. 11 shows a fuel cell evaluation of a membrane electrode assembly made from a sample of a phosphorus silicon oxide produced in accordance with Synthetic Example 1, recorded at 120° C.

The first fuel cell evaluation of an unoptimised Membrane Electrode Assembly (MEA) from this active material was recorded at 120° C. between 5% $H_2$ and air and displayed in FIG. 11. The IN curve shows initial OCV of 1V. The low current observed is due to the non-optimised electrode and thus low catalytic reactions. The thickness of the electrolyte membrane (2 mm) made from this material was also non optimised and thus induced high resistance of the cell.

Figure 12:
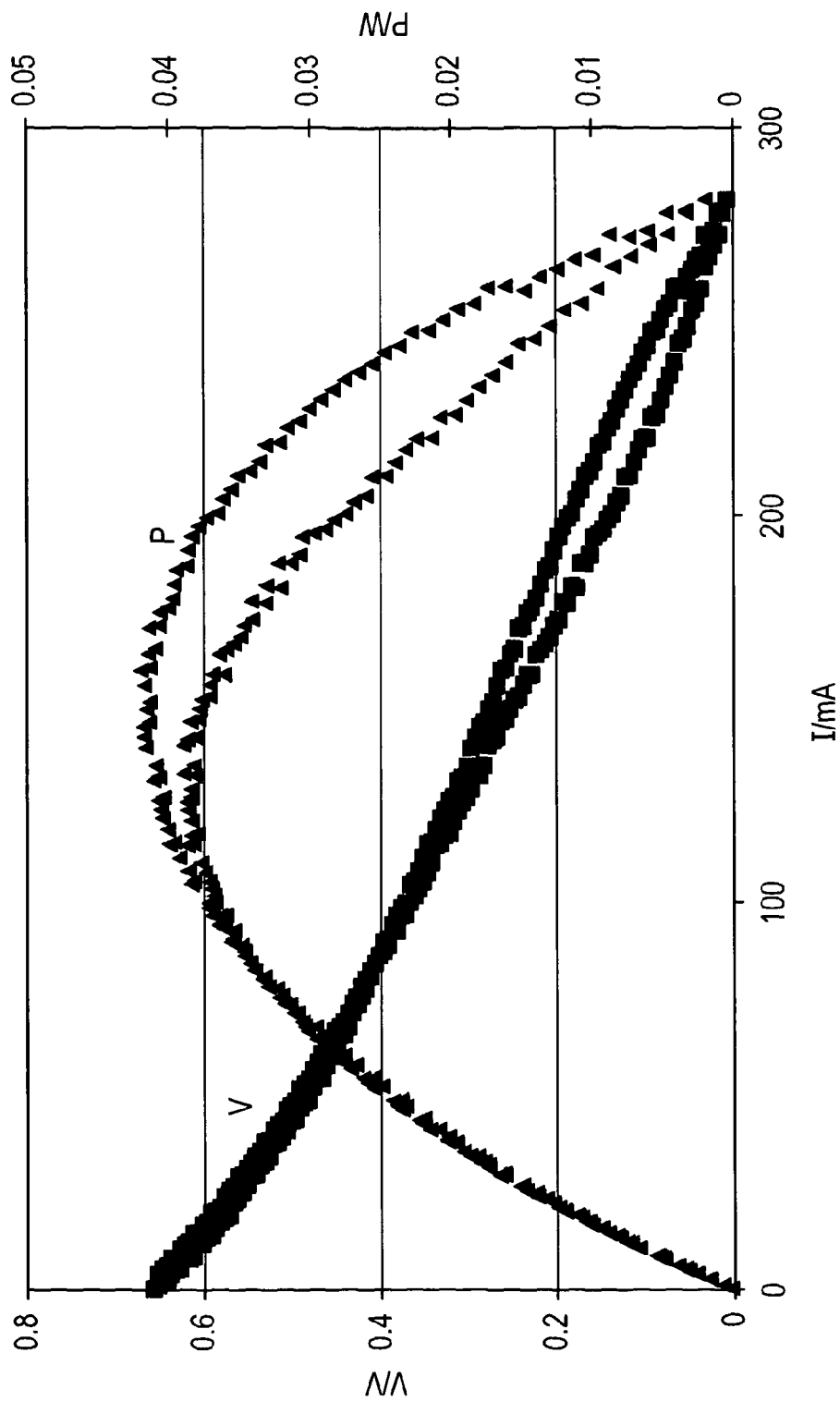
FIG. 12 shows a fuel cell evaluation of a membrane electrode assembly made from a sample of a phosphorus silicon oxide produced in accordance with Synthetic Example 1, PVDF was used as polymer matrix and recorded at 130° C.

Another unoptimised Membrane was prepared from this active material by using PVDF as a polymer matrix. An MEA was produced from this membrane which was 400μ in thickness and tested at 130° C. The IN curve of this cell between 5% $H_2$ and air at 130° C. is shown in FIG. 12.

Figure 13:
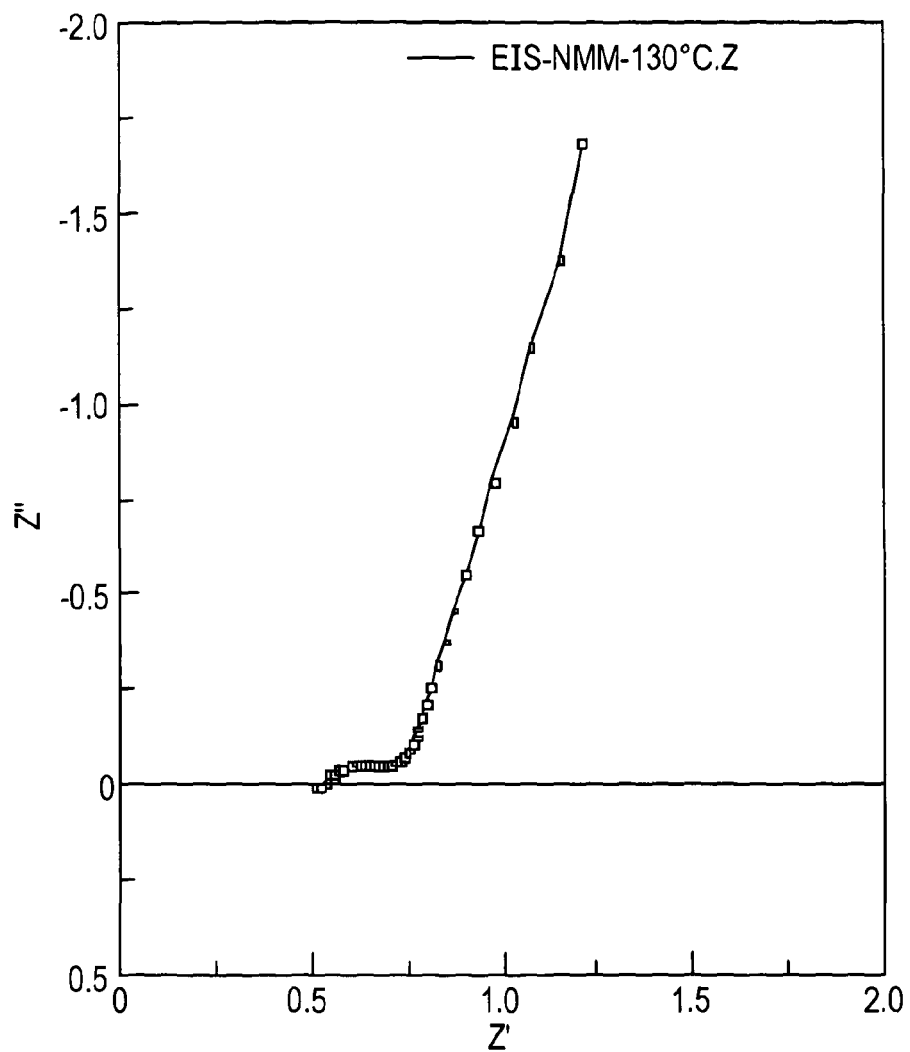
FIG. 13 shows the AC-impedance of a fuel cell with a sample of phosphorus silicon oxide produced in accordance with Synthetic Example 1 as electrolyte with PVDF as a polymer matrix and recorded at 130° C.

The resistance of the produced MEA operating at 130° C. (FIG. 13) was evaluated by AC-Impedance and it shows ohmic resistance of about 0.5Ω due to the ionic resistance of the electrolyte and an electrochemical resistance of about 0.75Ω.

CONCLUSION

Different techniques were undertaken to demonstrate that phosphorus silicon oxide presents very good characteristics for a electrolyte in a PEMFC.

Membrane Fabrication Examples
1: PVDF/Phosphorus Silicon Oxide Membrane

Phosphorus silicon oxide of the invention produced in accordance with Synthetic Example 2 was first ball-milled in methanol for 10 hours in order to obtain a very fine powder. The resultant slurry was dried in an oven at 80° C. overnight. Nanometer (4-10 nm) sized scale particles were obtained by this process. These particles were then mixed with PVDF (Sigma-Aldrich) and pressed on a hot plate. The pressing temperature was varied but typically conducted between 140 and 160° C. for a dwell time of 10 minutes. The applied pressure varies between 15 and 25 kN. Membranes with thicknesses of 150 to 400 μm were produced.

A MEA is produced by applying to each side of the membrane an electrode by hot-pressing together. The applied pressure varies between 5 and 10 kN at a temperature of 120° C. A single cell is ready to be mounted onto a jig and tested for AC-impedance and for fuel cell evaluation.

Figure 15:
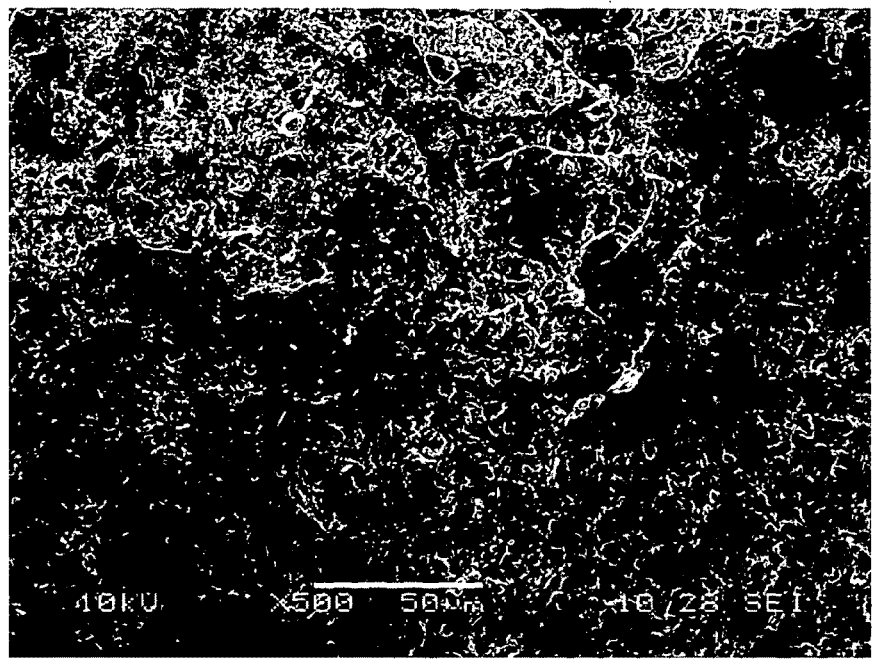
FIG. 15 depicts a scanning electron microscope image showing the microstructure of a hot-pressed membrane of the invention produced in accordance with Membrane Fabrication Example 1.

FIG. 15 depicts a scanning electron microscopic image (at a magnification of ×500) showing the microstructure of a hot-pressed membrane of the invention produced in this way.

Figure 16:
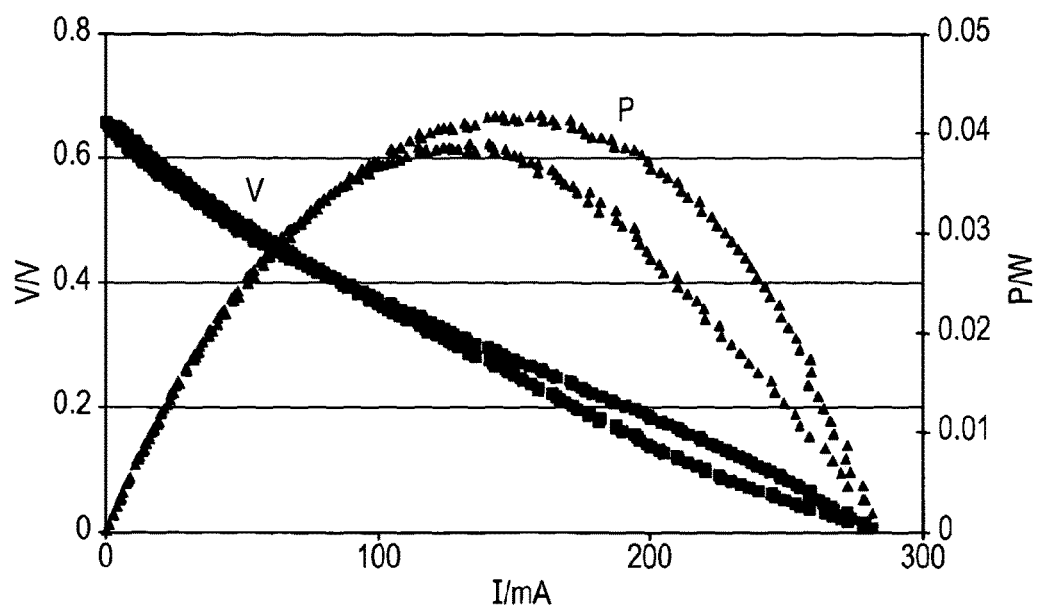
FIG. 16 shows the fuel cell evaluation/electrochemical testing of a 400 μm membrane produced in accordance with Membrane Fabrication Example 1 with operating conditions H$_2$/air at 130° C.

FIG. 16 shows the fuel cell evaluation/electrochemical testing of a 400 μm membrane produced in accordance with this example with operating conditions $H_2$/air at 130° C.

2: PTFE/Phosphorus Silicon Oxide Membrane

Phosphorus silicon oxide of the invention produced in accordance with synthetic Example 2 was first ball-milled in methanol for 10 hours in order to obtain a very fine powder. The resultant slurry was dried in an oven at 80° C. overnight. Nanometer (4-10 nm) sized scale particles were obtained by this process. These particles were then mixed with PTFE (Sigma-Aldrich) and pressed on a hot plate. The pressing temperature was varied but typically conducted between 140 and 160° C. for a dwell time of 10 minutes. The applied pressure varies between 20 and 40 kN. Membranes with thicknesses of 120 to 400 μm were produced.

Two different types of PTFE were used: commercial PTFE powder (Sigma-Aldrich) and a 60 wt. % dispersion in water (Sigma-Aldrich).

MEAs were produced by applying to each side of the membrane an electrode by hot-pressing together. The applied pressure varies between 5 and 10 kN at a temperature of 120° C. A single cell is ready to be mounted onto a jig and tested for AC-impedance and for fuel cell evaluation.

Figure 17:
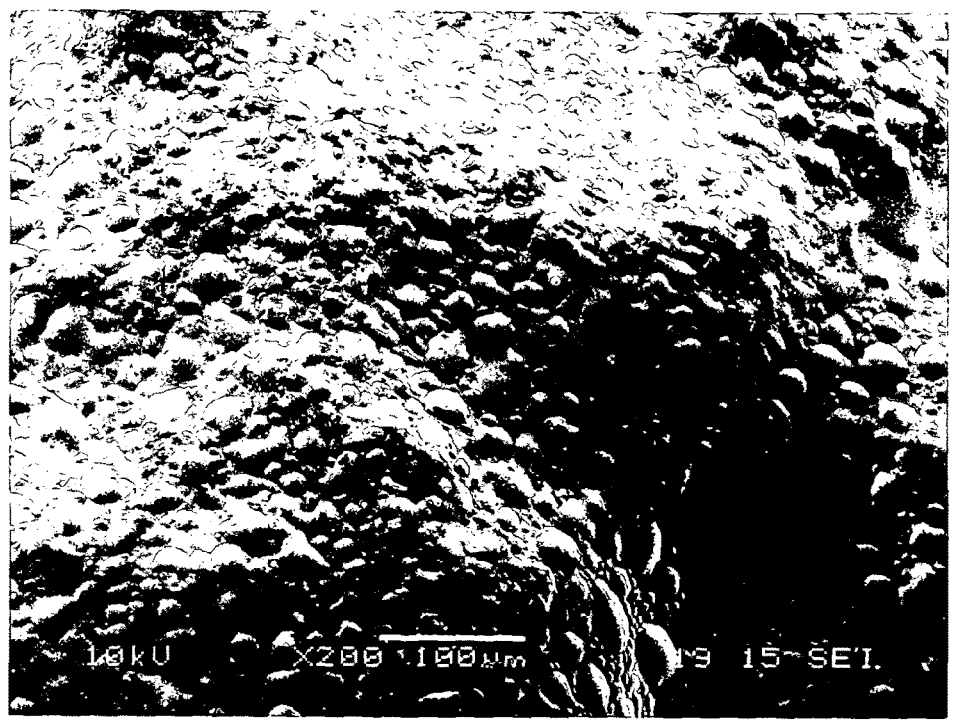
FIG. 17 depicts a scanning electron microscopic image showing the microstructure of a hot-pressed membrane produced in accordance with Membrane Fabrication Example 2 (made from a phosphorus silicon oxide of the invention produced in accordance with Synthetic Example 2 and PTFE powder).

FIG. 17 depicts a scanning electron microscopic image (at a magnification of x 200) showing the microstructure of a hot-pressed membrane produced in accordance with this example (made using PTFE powder.

3: Porous PTFE/Phosphorus Silicon Oxide Membrane

Porous PTFE (Porex® Product PM 21M; port size: 14 μm; thickness: 0.13 mm; Porex membrane, Alness, Scotland) is surface-treated by boiling it in methanol and then in mixed hydrogen peroxide and sulfuric acid ($H_2O_2/H_2SO_4$). The membrane is then washed in deionised water and dried.

The thus pre-treated membrane is then impregnated with a silicon source (such as solution of silicon chloride or tetraethyl orthosilicate), dried in air and boiled in pyrophosphoric acid/phosphoric acid for 12 hours. The resultant membrane is head-treated at 300 to 350° C. for a dwell time of 4 hours in a furnace. A porous PTFE membrane embedded with phosphorus silicon oxide in accordance with the present invention is thus produced.

A MEA is produced by applying to each side of the membrane an electrode by hot-pressing together. The applied pressure varies between 5 and 10 kN at a temperature of 120° C. A single cell is ready to be mounted onto a jig and tested for AC-impedance and for fuel cell evaluation.

Figure 18:
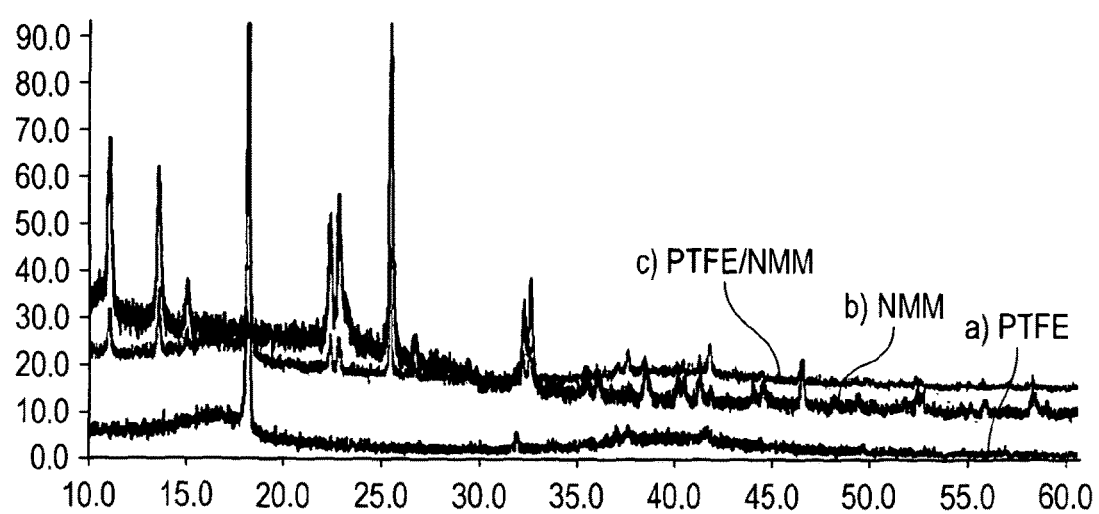
FIG. 18 shows X-ray diffractograms of (a) a porous PTFE sample, (b) a phosphorus silicon oxide produced in accordance with Synthetic Example 2; and (c) a membrane produced in accordance with Membrane Fabrication Example 3.

FIG. 18 shows X-ray diffractograms of (a) a porous PTFE sample, (b) a phosphorus silicon oxide produced in accordance with Synthetic Example 2; and (c) a membrane produced in accordance with this example with no impurity phase displaying crystallinity of the phosphorus silicon oxide and compatibility.

Figure 19:
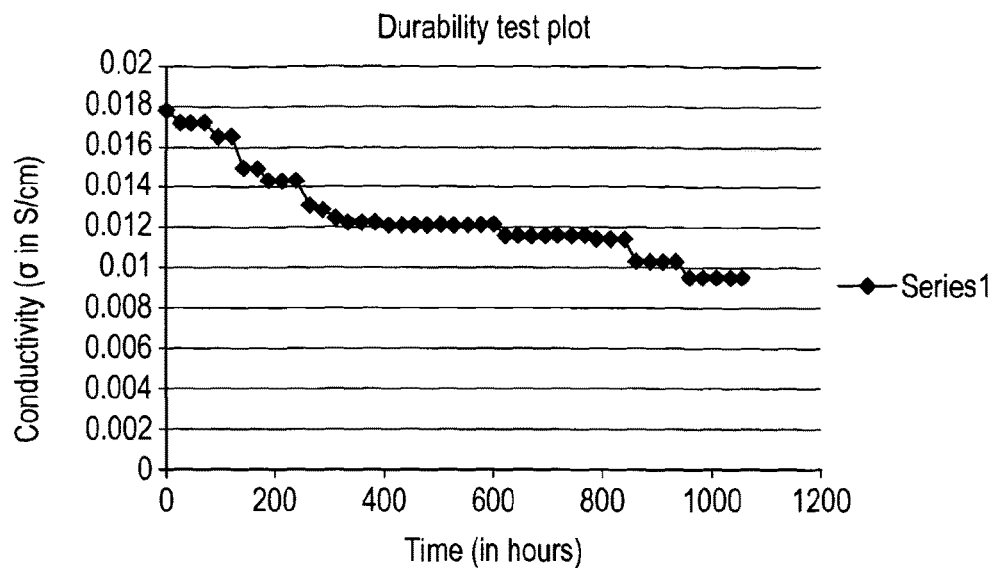
FIG. 19 is a durability plot showing that the electrical conductivity of a MEA made according to Membrane Fabrication Example 3 is maintained at at least about 0.01 S/cm for up to 1000 hours.

FIG. 19 is a durability plot showing that the electrical conductivity of a MEA made according to membrane fabrication Example 3 is maintained at at least about 0.01 S/cm for up to 1000 hours.

It will be understood that the porous PTFE used in this example is illustrative and that the PTFE can be substituted for any convenient porous matrix.

4: Poly(Acrylic Acid) Mixed with PTFE and/or PVDF/Phosphorus Silicon Oxide Membrane Poly(acrylic acid) was heated at 140° C. with a few drops (three or four) or ammonia solution for 1 hour. This serves to neutralise the poly(acrylic acid) to about pH 7 meaning that the subsequent conductivities cannot be attributable to initially protonated poly(acrylic acid). Then the poly(acrylic acid) was ball-milled with phosphorus silicon oxide prepared in accordance with Synthetic Example 2, the two components of the membrane being added in a ratio of 1:1 by weight. The temperature is then increased to 200° C. after adding 5 ml or de-ionised water. The resultant mixture was stirred until a solid is formed after 3 hours.

The resultant solid is washed with ether, dried and mixed with either PTFE or PVDF in a ratio of 5:1 by weight and hot-pressed. The resultant membrane was pressed at 80° C. for a dwell time of about 10 minutes. The applied pressure varies between 10 to 30 kN. Membranes with thicknesses of between about 130 and 300 μm were produced.

A MEA is produced by applying to each side of the membrane an electrode by hot-pressing together. The applied pressure varies between 5 and 10 kN at a temperature of 120° C. A single cell is ready to be mounted onto a jig and tested for AC-impedance and for fuel cell evaluation.

Figure 20:
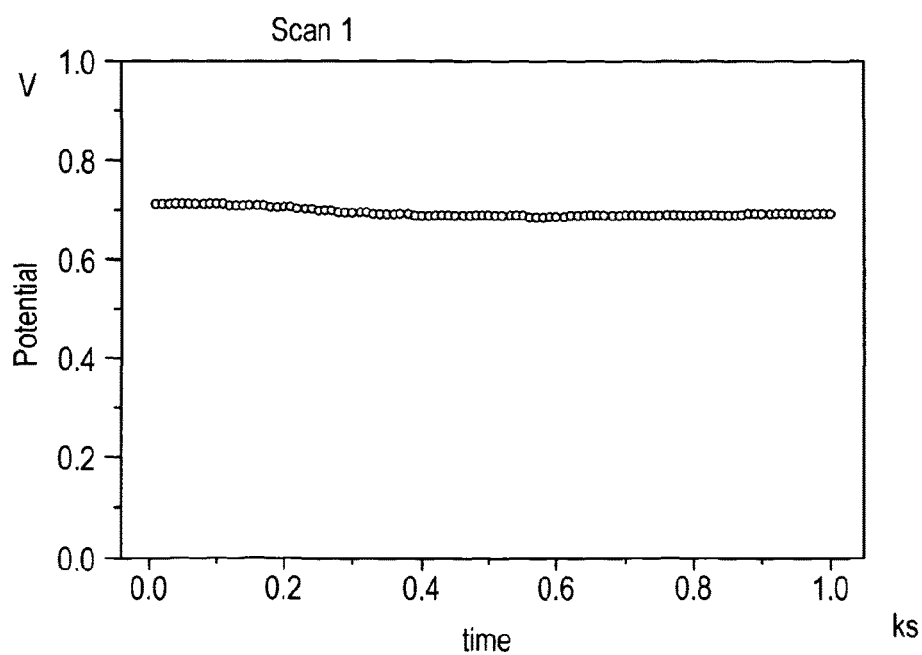
FIG. 20 shows that an open cell voltage of approximately 0.7 V is maintained for about 1000 seconds (1 ks) of a membrane produced in accordance with Membrane Fabrication Example 4 (made from a sample of phosphorus silicon oxide produced in accordance with Synthetic Example 2 and PTFE).

FIG. 20 shows that an open cell voltage of approximately 0.7 V is maintained for about 1000 seconds (1 ks) of a membrane produced in accordance with this example; membrane thickness: 300 μm; operating conditions: $H_2O$/air at 140° C.

The invention claimed is:

1. A proton-conducting membrane comprising a composition having the formula (I):

$$xXO_2 \cdot yY_2O_5 \qquad (I),$$

or a hydrate thereof, wherein:
0.5<x<0.7;
0.3<y<0.5;
X is silicon and optionally at least one or more atoms selected from the group consisting of titanium, germanium and zirconium; and
Y is phosphorus and optionally at least one or more atoms selected from the group consisting of vanadium, arsenic and antimony;
in which the composition comprises 50 wt % or more of crystalline material and the membrane has a thickness of from 1 micron to 500 microns;
wherein the membrane is proton-conducting.

2. The membrane of claim 1, wherein the composition is a hydrate of formula (Ia):

$$xXO_2 \cdot yY_2O_5 \cdot wyH_2O \qquad (Ia)$$

wherein x, X, y and Y are as defined in claim 1; and 0<w<3.

3. The membrane of claim 1, wherein X is silicon.

4. The membrane of claim 1, wherein Y is phosphorus.

5. The membrane of claim 1, wherein the composition is a phosphorus silicon oxide.

6. The membrane of claim 1, wherein the composition is a nanocrystalline, proton conductor based upon a $Si_5P_6O_{25}$ structure.

7. The membrane of claim 6, wherein the composition is a solid solution of silicon phosphorus oxide.

8. The membrane of claim 1, wherein the composition is in a form selected from the group consisting of nanoparticles, a nanostructured material, a thin film, an amorphous phase and a ceramic.

9. The membrane of claim 1, comprising a material comprising the composition, wherein the composition is chemically doped with one or more elements selected from the group consisting of boron, sulfur, arsenic, aluminium, titanium, antimony, tin, germanium and indium.

10. The membrane of claim 9, wherein the material comprises $SiP_2O_7$ in intimate mixture with the composition of formula (I).

11. The membrane of claim 9, wherein the material further comprises a polymer not having proton-conducting properties.

12. The membrane of claim 11, wherein the polymer not having proton-conducting properties is non-polar.

13. The membrane of claim 11, wherein the polymer not having proton-conducting properties is selected from the group consisting of a poly(alkylene), PVC, PVB, PTFE and PVDF.

14. The membrane of claim 11, wherein the polymer not having proton-conducting properties is porous, and the material comprises the composition in the pores of the porous polymer.

15. The membrane of claim 1, which is a proton exchange membrane effective for use in a proton exchange membrane fuel cell.

16. A-fuel cell comprising the membrane of claim 1.

17. A fuel cell stack comprising two or more fuel cells as defined in claim 16.

18. An article powered by a fuel cell as defined in claim 16 or a fuel cell stack as defined in claim 17.

19. A method of operating a fuel cell as defined in claim 16 or a fuel cell stack as defined in claim 17 comprising contacting the fuel cell with a reactant fuel and an oxidant to generate electricity, wherein the fuel cell is operated at a temperature of up to about 200° C. and/or a humidity of less than about 50%.

20. The membrane of claim 1, having a thickness of from 10 microns to 250 microns.

21. The membrane of claim 20, having a thickness of from 10 microns to 100 microns.

* * * * *